US009427872B1

(12) United States Patent
Bingham et al.

(10) Patent No.: US 9,427,872 B1
(45) Date of Patent: Aug. 30, 2016

(54) DEVICES AND METHODS FOR ENCODER CALIBRATION

(71) Applicant: Google Inc., Mountain View, CA (US)

(72) Inventors: Jeffrey Thomas Bingham, San Francisco, CA (US); Rob Wilson, Mountain View, CA (US); Advait Jain, San Francisco, CA (US); Miguel Rivas, San Francisco, CA (US); Lee Magnusson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/578,446

(22) Filed: Dec. 21, 2014

(51) Int. Cl.
 B25J 9/00 (2006.01)
 B25J 9/16 (2006.01)
 G01D 5/26 (2006.01)
 G01D 5/244 (2006.01)

(52) U.S. Cl.
 CPC ............ B25J 9/1692 (2013.01); B25J 9/1697 (2013.01); G01D 5/244 (2013.01); G01D 5/26 (2013.01); Y10S 901/02 (2013.01); Y10S 901/09 (2013.01); Y10S 901/47 (2013.01)

(58) Field of Classification Search
 CPC combination set(s) only.
 See application file for complete search history.

(56) References Cited

U.S. PATENT DOCUMENTS

| | | | | |
|---|---|---|---|---|
| 3,543,910 A * | 12/1970 | Martin | ...................... | B25J 5/04 198/341.08 |
| 4,453,085 A * | 6/1984 | Pryor | ..................... | B25J 18/002 250/203.1 |
| 5,227,930 A * | 7/1993 | Thanos | .............. | G11B 5/59677 360/77.03 |
| 5,535,306 A * | 7/1996 | Stevens | ................. | B25J 9/1692 700/254 |
| 5,946,449 A * | 8/1999 | Dickerson | ............. | B25J 9/1697 700/250 |
| 6,060,022 A * | 5/2000 | Pang | .................. | G01N 35/0095 422/63 |
| 6,308,113 B1 * | 10/2001 | Nowlin | .................. | B25J 9/1689 700/245 |
| 6,408,224 B1 * | 6/2002 | Okamoto | ............... | B25J 9/1661 29/721 |
| 7,987,021 B2 * | 7/2011 | Takaoka | ................. | B25J 9/1676 345/419 |
| 7,993,289 B2 * | 8/2011 | Quistgaard | .......... | A61B 5/6843 601/2 |
| 8,527,094 B2 * | 9/2013 | Kumar | .................. | A61B 34/30 600/101 |
| 8,786,613 B2 * | 7/2014 | Millman | ................. | G06T 13/20 345/473 |
| 9,162,359 B2 * | 10/2015 | Suyama | ................. | B25J 9/1676 |
| 2002/0128552 A1 * | 9/2002 | Nowlin | ........................ | 600/427 |
| 2005/0159840 A1 * | 7/2005 | Lin | ......................... | B23P 6/002 700/245 |
| 2006/0036351 A1 * | 2/2006 | Hopkins | ................ | G05B 11/42 700/280 |
| 2007/0067678 A1 * | 3/2007 | Hosek | ................ | G05B 23/0235 714/25 |

(Continued)

Primary Examiner — Jonathan L Sample
(74) Attorney, Agent, or Firm — McDonnell Boehnen Hulbert & Berghoff LLP

(57) ABSTRACT

A device is provided that comprises a hardware segment and an actuator to adjust a position of the segment within a range of positions. The device also comprises an encoder to rotate about an encoder axis responsive to the actuator adjusting the position. The device also comprises data storage that includes a dataset indicating offset angles between a reference configuration and a plurality of configurations of the encoder. The device also comprises a controller to cause the actuator to adjust the position to an end of the range of positions, responsively identify a range of encoder positions of the encoder that corresponds to the range of positions of the segment, modify the dataset such that the reference configuration corresponds to an end of the range of encoder positions, and determine a mapping between the offset angles indicated by the modified dataset and the range of positions of the hardware segment.

20 Claims, 15 Drawing Sheets

(56) References Cited

U.S. PATENT DOCUMENTS

| | | | | |
|---|---|---|---|---|
| 2007/0281149 | A1* | 12/2007 | Martens | C09J 5/00 428/336 |
| 2009/0058208 | A1* | 3/2009 | Kimura | H02K 5/1732 310/83 |
| 2010/0234857 | A1* | 9/2010 | Itkowitz | G09B 23/285 606/130 |
| 2010/0300230 | A1* | 12/2010 | Helmer | B25J 9/106 74/469 |
| 2011/0190933 | A1* | 8/2011 | Shein | B62D 55/075 700/258 |
| 2012/0012101 | A1* | 1/2012 | Trujillo | F24J 2/38 126/601 |
| 2012/0133318 | A1* | 5/2012 | Komatsu | B25J 9/1075 318/563 |
| 2012/0143212 | A1* | 6/2012 | Madhani | A61B 19/2203 606/130 |
| 2012/0239198 | A1* | 9/2012 | Orita | B25J 9/1641 700/260 |
| 2013/0096862 | A1* | 4/2013 | Nakamura | G01D 5/347 702/94 |
| 2013/0345876 | A1* | 12/2013 | Rudakevych | B25J 9/1697 700/259 |
| 2014/0058406 | A1* | 2/2014 | Tsekos | A61B 19/2203 606/130 |
| 2014/0201571 | A1* | 7/2014 | Hosek | G06F 11/2257 714/26 |
| 2014/0277730 | A1* | 9/2014 | Nakamura | B25J 13/088 700/258 |
| 2014/0277847 | A1* | 9/2014 | Cann | B25J 5/007 701/2 |
| 2015/0198467 | A1* | 7/2015 | Nakamura | G01D 5/3473 250/231.14 |

* cited by examiner

DEVICES AND METHODS FOR ENCODER CALIBRATION

BACKGROUND

Robotic devices may be utilized in various industrial and service applications such as assembly, inspection, work in hazardous environments, and transportation. A robotic device may include various components such as sensors, cameras, manipulators, or robotic arms. Additionally, the robotic device may be remotely or autonomously operated to perform various tasks. For example, a computing device may communicate with the robotic device to provide operation instructions or to receive sensor measurements.

SUMMARY

In one example, a device is provided that comprises a hardware segment. The device also comprises an actuator to actuate the hardware segment within a range of positions. The device also comprises an encoder to rotate about an encoder axis responsive to the actuator adjusting the position of the hardware segment. The device also comprises data storage that includes a dataset indicating offset angles between a reference configuration and a plurality of configurations of the encoder. The reference configuration is indicative of the encoder being at a given encoder position about the encoder axis. The device also comprises a controller to cause the actuator to adjust the position of the hardware segment to an end of the range of positions. The controller also responsively identifies a range of encoder positions that corresponds to the range of positions of the hardware segment. The controller also modifies the dataset such that the reference configuration is indicative of the encoder being at an end of the range of encoder positions. The controller also determines a mapping between the offset angles indicated by the modified dataset and the range of positions of the hardware segment.

In another example, a method is provided that includes a robotic device adjusting a position of a hardware segment of the robotic device to an end of a range of positions of the hardware segment. The robotic device may include one or more processors. The method also includes responsively identifying a range of encoder positions about an encoder axis of an encoder of the robotic device that corresponds to the range of positions of the hardware segment. The encoder rotates about the encoder axis responsive to adjustment of the position of the hardware segment. The method also includes modifying a dataset indicating offset angles between a reference configuration and a plurality of configurations of the encoder such that the reference configuration corresponds to an encoder position outside the range of encoder positions. The method also includes determining a mapping between the offset angles indicated by the modified dataset and the range of positions of the hardware segment.

In yet another example, a method is provided that includes a computing device receiving calibration data from a robotic device. The computing device includes one or more processors. The calibration data is indicative of a given encoder position of an encoder. The encoder rotates about an encoder axis responsive to adjustment of a position of a hardware segment within a range of positions. The given encoder position is associated with the hardware segment being at an end of the range of positions. The method also includes modifying a dataset indicating offset angles between a reference configuration and a plurality of configurations of the encoder such that the reference configuration is indicative of the encoder being at the given encoder position. The method also includes determining a mapping between the offset angles indicated by the modified dataset and the range of positions of the hardware segment. The method also includes providing the mapping to the robotic device.

In still another example, a system is provided that includes means for a robotic device adjusting a position of a hardware segment of the robotic device to an end of a range of positions of the hardware segment. The robotic device includes one or more processors. The system also includes means for responsively identifying a range of encoder positions about an encoder axis of an encoder of the robotic device that corresponds to the range of positions of the hardware segment. The encoder rotates about the encoder axis responsive to adjustment of the position of the hardware segment. The system also includes means for modifying a dataset indicating offset angles between a reference configuration and a plurality of configurations of the encoder such that the reference configuration corresponds to an encoder position outside the range of encoder positions. The system also includes means for determining a mapping between the offset angles indicated by the modified dataset and the range of positions of the hardware segment.

In still another example, a system is provided that includes means for a computing device receiving calibration data from a robotic device. The computing device includes one or more processors. The calibration data is indicative of a given encoder position of an encoder. The encoder rotates about an encoder axis responsive to adjustment of a position of a hardware segment within a range of positions. The given encoder position is associated with the hardware segment being at an end of the range of positions. The system also includes means for modifying a dataset indicating offset angles between a reference configuration and a plurality of configurations of the encoder such that the reference configuration is indicative of the encoder being at the given encoder position. The system also includes means for determining a mapping between the offset angles indicated by the modified dataset and the range of positions of the hardware segment. The system also includes means for providing the mapping to the robotic device.

These as well as other aspects, advantages, and alternatives, will become apparent to those of ordinary skill in the art by reading the following detailed description, with reference where appropriate to the accompanying figures.

DETAILED DESCRIPTION

Figure 1:
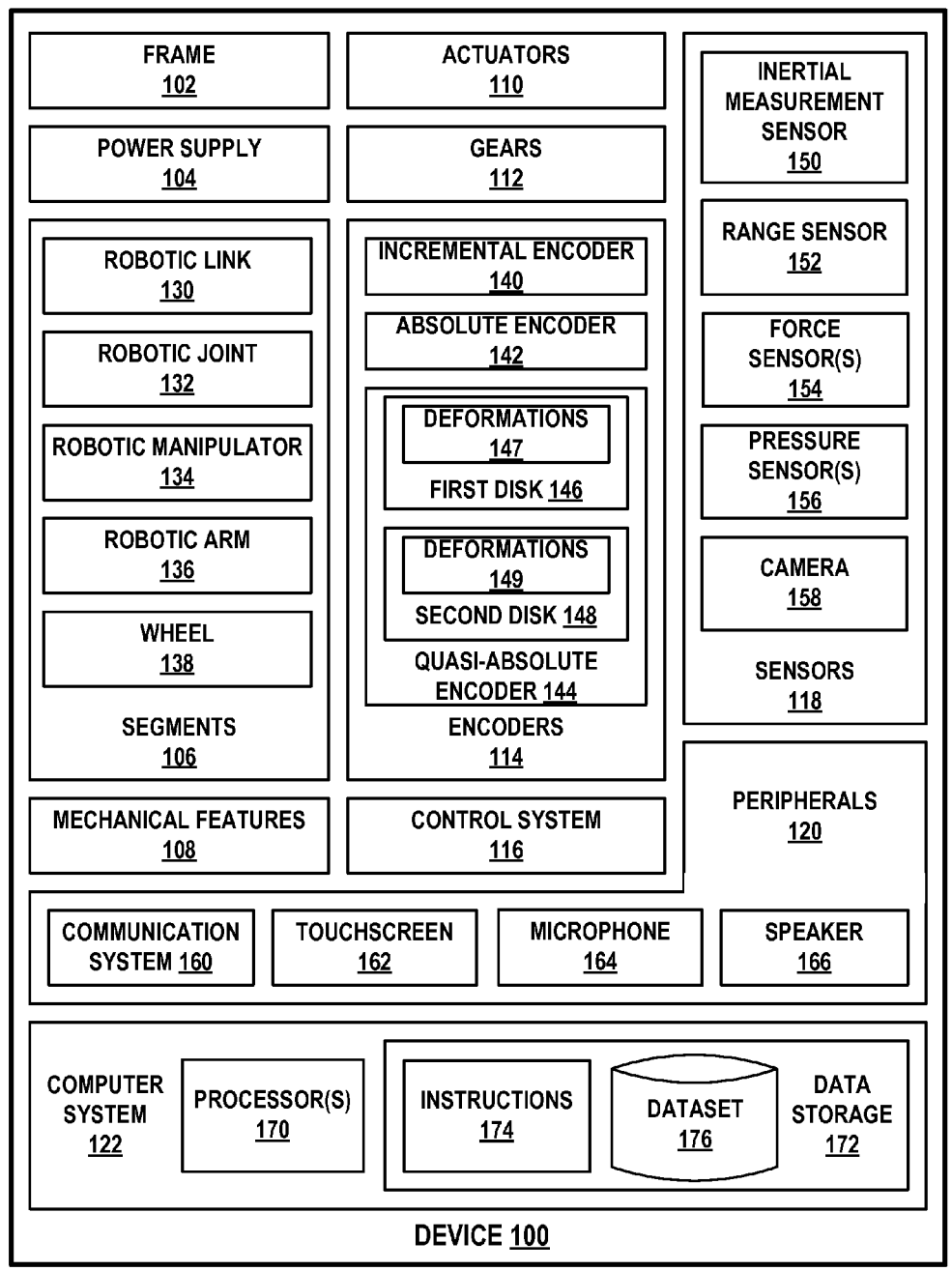
FIG. 1 is a simplified block diagram of an example device, in accordance with at least some embodiments herein.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein, for example.

Within examples, a robotic device is provided that is configured to adjust a position of a hardware segment (e.g., link, joint, robotic arm, etc.). In an example scenario, the robotic device includes a link arranged to rotate about a joint. In the scenario, the robotic device receives a request to move the link to a given segment position. In turn, the robotic device causes an actuator to actuate the link. In the scenario, the actuator is coupled to an encoder that rotates about an encoder axis in response to the adjustment of the position by the actuator. Further, the encoder provides encoder values that correspond to encoder positions of the encoder about the encoder axis. To facilitate adjustment of the segment position, the robotic device utilizes a mapping that associates encoder positions with positions of the link. Thus, in the scenario, the robotic device causes the actuator to actuate the segment to the given segment position that corresponds to a given encoder position indicated by the mapping.

In some examples, the mapping is configured as a fixed and finite table that includes entries for a plurality of segment/encoder configurations. A segment/encoder configuration, for example, may correspond to a geometric relationship between a given segment position and a corresponding encoder position (e.g., a given configuration may associate an encoder position/value with the segment being at a hard-stop position, etc.). A reference configuration in the mapping, for example, may assign a reference position of the link, such as a home position or a minimum/maximum position or any other position of the link, to a reference encoder position/value. In turn, each position of the link can be indicated as an offset encoder position and/or an offset encoder rotation angle with respect to the reference configuration. However, during assembly of the robotic device and/or installation of the encoder, the encoder may be coupled to the hardware segment at an arbitrary orientation (e.g., fixed physical relationship between the encoder and the hardware segment due to placement of the encoder in the robotic device, etc.). In turn, the entries in the mapping including the reference configuration may correspond to different actual segment positions and/or different actual encoder positions/values due to such coupling variability. Accordingly, in some examples, the present method allows calibrating the encoder and/or modifying the mapping.

Continuing with the example scenario, the encoder positions are represented in the mapping by offset angles to a reference configuration. By way of example, an encoder position of the encoder that corresponds to the reference configuration is represented in the mapping as an angle of zero radians, and as the encoder rotates about the encoder axis in a given direction (e.g., clockwise, anticlockwise, etc.), a corresponding encoder position (e.g., measurement) is represented in the mapping by a given offset angle to the reference configuration in the range of zero radians to $2\pi$ radians. Thus, the mapping includes a continuous range of angles for most configurations of the encoder and a discontinuity at the reference configuration ($0/2\pi$ radians). Alternatively or additionally, in some examples, the various configurations of the encoder are represented as a number of encoder ticks or pulses with respect to the reference configuration. The discontinuity, in these examples, is represented in the mapping as the encoder value of zero and/or the maximum number of encoder ticks the encoder provides.

In some examples, the discontinuity introduces a complexity for various operations of the robotic device. As a variation of the scenario above by way of example, consider an operation where the robotic device determines the direction and the distance moved by the link from a first position to a second position. In this example, the robotic device utilizes the mapping to determine a first angle (e.g., $4\pi/8$ radians) and a second angle (e.g., $6\pi/8$ radians) that correspond, respectively, to the first position and the second position. The robotic device then subtracts the two angles to determine a change in angle (e.g., $6\pi/8-4\pi/8=2\pi/8$ radians), i.e. $2\pi/8$ radians in a positive direction. However, the same computation would yield a different result if the reference configuration was between the two angles. For example, if the first angle was instead $15\pi/8$ radians and the second angle was instead $\pi/8$, the actual distance moved would still be $2\pi/8$ radians in the positive direction. However, the computed change in angle would be ($\pi/8-15\pi/8=-14\pi/8$ radians), and the computed distance and direction would be $14\pi/8$ in a negative direction. The discrepancy in the computation is due to the sudden jump in angle at the $0/2\pi$ radians discontinuity of the mapping. Thus, in this example, the additional complexity involves adjusting the operations/computations of the robotic device to account for the presence of the discontinuity in the mapping.

Accordingly, in some examples, the present method mitigates the complexity introduced by discontinuities that may arise when defining segment positions by mapping encoder values to segment/encoder configurations. For instance, in some embodiments herein, a range of segment positions within which a hardware segment of a robotic device can move is defined according to the design and/or structure of the robotic device. As a variation of the example scenario above, a range of possible segment positions of the link is defined at two ends of the range by two mechanical features (e.g., detents, hard stops, etc.) that prevent the link from moving beyond the two ends of the range. In turn, a range of encoder positions corresponds to the range of possible segment positions of the link. In accordance with some examples herein, the robotic device modifies the mapping such that the reference configuration corresponds to one end of the range of encoder positions, or to an encoder position outside the range of physically reachable encoder positions. In turn, the offset angles in the mapping are modified in accordance with the adjusted reference configuration. Through this process, the offset angles in the modified mapping are a continuous range of angles representing the range of encoder positions that correspond to the range of possible segment positions of the link, and the discontinuity (e.g., $0/2\pi$ radians) is placed outside the range of possible encoder positions or at the end of the range of possible encoder positions. Additionally, through this process, the various operations of the robotic device described above are performed without the complex adjustments to account for the discontinuity in the mapping.

In other examples herein, the present method mitigates the complexity while keeping the reference configuration within the range of encoder positions. As a variation of the scenario above by way of example, the robotic device is configured to determine/adjust positions of the link relative to a home position (e.g., center position, initialization position, etc.) of the link. In this example, the robotic device receives an indication of the home position (e.g., a particular encoder position/value) from the encoder, and assigns positive values (e.g., offset angles, etc.) in the mapping for positions of the link at a first direction relative to the home position, negative values for positions of the link at a second direction relative to the home position, and a value of zero for the home position of the link. In turn, for example, where the robotic device receives a request to adjust the position of the link to a given position relative to the home position, the robotic device then utilizes the mapping to perform the adjustment of the position. Further, for example, by assigning the reference configuration to the home position and utilizing positive/negative values in the mapping for positions of the link at opposite directions to the home position, the present method allows an alternative solution for the complexities discussed in the example above due to the discontinuity.

It is noted that the scenarios and examples above are for illustrative purposes only. Other scenarios, examples, and configurations are possible as well and are described in greater detail within exemplary embodiments herein. Additionally, many parameters of the embodiments herein may be varied according to various applications. For example, methods herein may be implemented by various devices having various numbers, arrangements, and/or combinations of components.

Referring now to the Figures, FIG. 1 is a simplified block diagram of an example device 100, in accordance with at least some embodiments herein. As shown, the device 100 includes a frame 102, a power supply 104, hardware segments 106, mechanical features 108, actuators 110, gears 112, encoders 114, a control system 116, sensors 118, peripherals 120, and a computer system 122. In other embodiments, the device 100 includes more, fewer, or different components, and each component includes more, fewer, or different sub-components. Additionally, the components and sub-components shown can be combined or divided in any number of ways.

The frame 102 is configured to support the various components of the device 100. In some embodiments, the frame 102 includes a solid material such as aluminum, titanium, other metal/metal-alloy, plastic, composite, wood, or any other solid material having shape and material characteristics to support the components of the device 100.

The power supply 104 is configured to provide power to some or all of the components of the device 100. To this end, the power supply 104 includes, in some examples, a rechargeable lithium-ion or lead-acid battery. In some embodiments, one or more banks of batteries are configured to provide electrical power. Other power supply materials and configurations are possible as well, such as non-rechargeable batteries, etc. For example, the power supply 104 optionally includes a source of energy that powers some or all the components of the device 100. Example sources of energy include gasoline, diesel, propane, other compressed gas-based fuels, ethanol, solar panels, batteries, or any other sources of energy. Further, for example, the power supply 104 optionally includes wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the device 100. Additionally or alternatively, in some examples, the power supply 104 includes a combination of fuel tanks, batteries, capacitors, flywheels, etc.

The plurality of moveable hardware segments 106 include any combination of physical components that are actuated by the device 100 to interact with an environment of the device 100. As shown, the hardware segments 106 include a robotic link 130, a robotic joint 132, a robotic manipulator 134, a robotic arm 136, and a wheel 138. However, in some embodiments, the segments 106 include a different combination of segments. In one embodiment, the segments 106 alternatively include three links, four joints, one manipulator, and no wheels. Other combinations are possible as well.

The link 130 is a rigid component of the device 100 that has a particular shape. As such, the link 130 includes a solid material such as aluminum, titanium, other metal/metal-alloy, plastic, composite, wood, or any other solid material.

The joint 132 is a component of the device 100 that allows a rotational and/or translational degree of freedom to the link 130. In some embodiments, the joint 132 is a round rotating structure connected to the link 130 to allow the link 130 to rotate about an axis of the joint 132.

The manipulator 134 includes a machine or robotic mechanism that allows the device 100 to interact with various objects in the environment of the device 100. In some embodiments, the manipulator 134 includes a series of segments such as the link 130 and the joint 132 that are configured to grasp and/or move objects in the environment of the device 100, usually in one or more degrees of freedom. Alternatively, in some embodiments, the manipulator 134 includes an end-effector tool, such as a robotic wrist or a magnet, which is configured to manipulate the objects in the environment.

The arm 136 includes any combination of an interconnected set of links, joints and/or manipulators, such as the link 130, the joint 132, and/or the manipulator 134, to support or move an object through space.

The wheel 138 includes any type of wheel, such as a single wheel, double wheel, compound wheel, castor wheel, or any other wheel configured to rotate to move the device 100 along a heading (e.g., steering direction) of the wheel 38. To this end, the wheel 138 includes one or more solid materials suitable for performing the function of the wheel 138 such as plastic, composite, metal, metal compound, etc. In one embodiment, a castor wheel is configured to roll along a straight line path, or mount on a pivot (e.g., swivel, etc.) to align the wheel 138 with a direction of travel. Additionally, in some examples, the wheel 138 includes an energy-absorbing material (e.g., rubber, etc.) to facilitate operation and/or maintenance of the wheel 318. In one example, the wheel 138 includes a tire coupled to a rim of the wheel 138.

The one or more mechanical features 108 may include any physical feature positioned at an end of a range of positions of at least one of the segments 106. In one example, the mechanical features 108 include screws, bolts, or other components that connect various parts (e.g., segments 106) of the device 100 to one another. In another example, the mechanical features 108 include an indentation or a ridge that has a particular shape. In yet another example, the mechanical features 108 may include an object glued, engraved, or otherwise coupled to an end of the range of positions of at least one of the segments 106 (e.g., detent, hard stop, etc.). Other examples are possible as well.

The plurality of actuators 110 are configured to actuate the segments 106 and/or to maintain positions of the segments 106. As such, the actuators 110 include any combination of actuators such as an electric motor, a steam motor, a sterling motor, a combustion motor, a hydraulic motor, a pneumatic motor, or any other actuator. In some embodiments, a given actuator includes multiple types of motors. For example, a gas-electric hybrid device includes a gasoline engine and an electric engine that are intermittently activated as the given actuator. Other examples are possible as well.

The gear(s) 112 are configured to couple the actuators 110 with the segments 106. In some embodiments, the gears 112 provide a gear ratio that corresponds, for example, to a number of rotations of a given actuator about an axis of the given actuator to a single rotation (or fixed amount of motion) of a given segment. In other embodiments, the gear ratio corresponds to a number of rotations (or multiples of the fixed amount of motion) of the given segment to a single rotation of the given actuator. Thus, for example, the gears 112 may allow transmitting torques of the actuators 110 to the segments 106. In some examples, the gears 112 are configured as a rotating machine part (e.g., cogwheel, etc.) having cut teeth, or cogs, which mesh with another toothed machine part having a different/same number of teeth to provide the gear ratio. Additionally or alternatively, in some examples, the gears 112 include more than one gear arranged as a transmission system to change speed, torque, and direction of rotation of the segments 106 relative to the actuators 110. Additionally or alternatively, in some examples, the gears 112 include other transmission components such as clutches, differentials, pulleys, belts, drive shafts, and/or other elements.

The encoders 114 are coupled to the actuators 110 and configured to provide data indicative of motion and/or orientation of the actuators 110. Example encoders include rotary encoders, shaft encoders, or any other electro-mechanical device configured to convert an angular position/motion of a given actuator to an analog or digital signal (e.g., encoder values, encoder biases, etc.). For example, a rotary encoder rotates about an encoder axis in response to motion of a respective actuator. As shown, the encoders 114 include an incremental encoder 140, an absolute encoder 142, and a quasi-absolute encoder 144. However, in some embodiments, the encoders 114 may include any combination of encoders. In one embodiment, the encoders 114 only include quasi-absolute encoders. Other combinations are possible as well.

In some examples, data provided by the encoders 114 indicates a change in a position (e.g., orientation) of a given actuator of the actuators 110. Further, in some examples, the encoders 114 provide a signal (e.g., index signal, etc.) indicative of the given actuator being at a particular orientation. Further, in some examples, the data provided by the encoders 114 is processed by the device 100 to determine speeds of the actuators 110. In these examples, a time measurement is obtained by the device 100 in addition to the data from the encoders 114 to determine the speeds of the actuators 110.

The incremental encoder 140 is configured to provide data indicative of motion/position of the actuators 110. In one example, the incremental encoder 140 is a rotary encoder that provides a reading (e.g., pulse, encoder value, etc.) for a given amount of rotation of the encoder 140 about a respective encoder axis. Further, in some examples, the incremental encoder 140 provides an index signal for every complete rotation of the encoder 140 about the encoder axis. Thus, in these examples, device 100 rotates the incremental encoder 140 (e.g., by actuating the respective actuator, etc.) until detecting the index signal to determine an exact configuration of the incremental encoder 140.

The absolute encoder 142 is configured to detect motion/position/orientation of the actuators 110 even if the absolute encoder 142 is not provided with power. In one example, the absolute encoder 142 provides data indicative of an orientation of a respective actuator without the device 100 actuating a respective segment. Thus, in some examples, the device 100 determines an exact configuration of the absolute encoder 142 without rotating the absolute encoder 142 to detect an index signal.

The quasi-absolute encoder 144 is also configured to provide data indicative of motion/position of the actuators 110. Similarly to the incremental encoder 140, the encoder 144 provides readings for a given amount of rotation of the encoder 144 about a respective encoder axis. Additionally, the encoder 144 provides a plurality of index signals that correspond to a plurality of encoder positions of the encoder 144 about the respective encoder axis. Consequent index signals of the encoder 144 are separated by varying offset angles about the encoder axis. The offset angles are indicated in a dataset (e.g., dataset 176) accessible to the device 100. In turn, the device 100 determines an exact encoder position of the encoder 144 after rotating the encoder 144 to detect just two index signals, rather than a complete rotation like the incremental encoder 140. As shown, the quasi-absolute encoder 144 includes a first disk 146 and a second disk 148.

The first disk 146 includes a first plurality of deformations 147. Adjacent deformations of the deformations 147 may be separated by a given distance, or may be separated by slightly varying distances. Thus, the encoder 144 provides encoder values similarly to the incremental encoder 140 that each indicate a similar or same change in the encoder position of the encoder 144 based on detection of the deformations 147 of the first disk 146. For example, the encoder 144 provides a given encoder value based on detection of a corresponding deformation of the deformations 147. In some examples, the first disk 146 includes a solid material having a round shape that rotates in the center of the encoder 144. In other examples, the first disk 146 is coupled to a rotary disk (not shown) of the encoder 144. For example, the first disk 146 can be a sticker glued to such rotary disk. Other examples are possible as well.

The second disk 148 is coupled to the first disk 146 and includes a second plurality of deformations 149. In some examples, the second disk 148 includes a solid material having a round shape that couples to the first disk 146. In other examples, the second disk 148 is a sticker that includes the deformations 149 and is glued to the first disk 146. Unlike the deformations 147, the deformations 149 are separated by varying given offset angles (e.g., distances). Further, the encoder 144 provides one or more of the plurality of index signals based on detection of one or more corresponding deformations of the deformations 149. In some examples, the given offset angles correspond to the offset angles indicated in the dataset 176 in line with the discussion above.

The deformations 147 and 149, as well as similar deformations (not shown) of the encoders 140 and 142, are configured according to an implementation of the respective encoder. In one example, where the encoder 144 is a mechanical encoder, the deformations 147/149 are a set of concentric rings of openings in a solid disk or other type of disk (e.g. disks 146/148). In another example, where the encoder 144 is an optical encoder, the disks 146/148 are formed of glass/plastic/etc. and the deformations 147/149 are transparent or opaque areas of the disks 146/148. In yet another example, where the encoder 144 is a magnetic encoder, the deformations 147/149 are a series of magnetic poles positioned along a respective disk (e.g. disks 146/148). In still another example, where the encoder 144 is a capacitive encoder, the disks 146/148 are asymmetrical shaped disks rotated within the encoder 144 to adjust capacitance between two electrodes (e.g., asymmetry is the deformations 147/149, etc.). Other implementations are possible as well. Further, in some embodiments, the first disk 146 and the second disk 148 are implemented as different types of encoders that are combined in the encoder 144. In one example, the first disk 146 is implemented similarly to a mechanical encoder, and the second disk 148 is implemented similarly to a magnetic encoder. Other examples are possible as well.

The control system 116 is configured to control operation of the device 100 and/or components thereof. For example, the control system 116 includes any combination of mechanisms configured to control the segments 106. In one embodiment, the device 100 is an assembly line robot, and the control system 116 controls the robotic arm 136 to move an object from one location to another.

In some examples, the control system 116 is implemented as a control loop that receives inputs from the encoders 114 and provides output signals to control power provided to the actuators 110 to achieve a particular speed or motion of the segments 106. Example control loops include open loops, closed loops, etc. In one example, the control system 116 is implemented as a proportional-integral-derivative (PID) controller. Other examples are possible as well. In these examples, the control system 116 is configured to measure and/or control electric signals in the actuators 110.

The sensor(s) 118 include any number of sensors configured to sense information about an environment in which the device 100 is located, as well as sensing components in the device 100. Further, in some examples, the sensors 118 include one or more actuators (not shown) to actuate some or all of the sensors 118. As shown, the sensors 118 include an inertial measurement sensor (IMS) 150, a range sensor 152, one or more force sensors 154, one or more pressure sensors 156, and a camera 158. In some embodiments, the sensors 118 include additional sensors as well, including, for example, sensors that monitor internal systems of the device 100 (e.g., an $O_2$ monitor, a fuel gauge, a temperature monitor, etc.).

The IMS 150 includes any combination of sensors configured to sense position and orientation changes of the device 100 or components thereof based on inertial acceleration. In some embodiments, the combination of sensors includes accelerometers and/or gyroscopes.

The range sensor 152 is any sensor configured to sense objects in the environment in which the device 100 is located as well as various components of the device 100 (e.g., segments 106). In some examples, the range sensor 152 includes a RADAR (e.g., using radio signals), a LIDAR (e.g., using lasers), an Infrared range sensor (e.g., using infrared), or any other range sensor. In one example, the range sensor 152 includes a light source and a light detector configured, respectively, to emit light and detect reflections of the light. Further, in some embodiments, the range sensor 152 is configured to operate in a coherent (e.g., using heterodyne detection) or an incoherent detection mode. In some embodiments, in addition to sensing the objects/components, the range unit 152 is configured to sense the speed and/or heading of the objects/components.

The force sensor(s) 154 include any combination of sensors configured to measure force at various parts of the device 100. In some examples, the force sensors 154 include a force gauge, a spring scale, a strain gauge, a load cell, a load pin, or any other force sensor. In some embodiments, the force sensors 154 are arranged in various parts of the device 100 to measure forces along the device 100. In one example, a strain gauge is placed between the robotic link 130 and the robotic joint 132 to measure the force between the two components. In another example, the device 100 adjusts a position of a given segment to an upright position, and an associated force sensor measures the weight of the given segment.

The pressure sensor(s) 156 include any combination of sensors configured to measure pressure at various parts of the device 100. In some examples, the pressure sensors 156 include absolute pressure sensors, gauge pressure sensors, vacuum pressure sensors, differential pressure sensors, sealed pressure sensors, etc. In some embodiments, the pressure sensors 156 are arranged in various parts of the device 100 to measure various pressures.

The camera 158 includes any camera (e.g., a still camera, a video camera, etc.) configured to capture images of the environment in which the device 100 is located or to capture images of the various components of the device 100. To this end, the camera may take any of the forms described above or may take any other form. The sensors 118 may additionally or alternatively include components other than those shown in FIG. 1. For example, the sensors 118 may include an inclinometer (not shown) that measures angles of slope of any of the segments 106 with respect to gravity.

Peripherals 120 are configured to allow the device 100 to interact with external sensors, other devices, objects in the environment of the device 100, and/or a user, etc. To this end, the peripherals 120 include a communication system 160, a touchscreen 162, a microphone 164, and/or a speaker 166.

The communication system 160 includes a wired communication interface (e.g., parallel port, USB, etc.) and/or a wireless communication interface (e.g., antennae, transceivers, etc.) to receive and/or provide signals from/to external devices. In some examples, the communication system 160 receives instructions for operation of the device 100. Additionally or alternatively, in some examples, the communication system 160 provides output data such as data from the encoders 114 and/or data from the sensors 118.

The touchscreen 162 may be used by a user to input commands to the device 100. To this end, in some examples, the touchscreen 162 is configured to sense at least one of a position and a movement of a user's finger via capacitive sensing, resistance sensing, or a surface acoustic wave process, among other possibilities. Further, in some examples, the touchscreen 162 is capable of sensing finger movement in a direction parallel or planar to the touchscreen surface, in a direction normal to the touchscreen surface, or both, and is also capable of sensing a level of pressure applied to the touchscreen surface. In some examples, the touchscreen 162 is formed of one or more translucent or transparent insulating layers and one or more translucent or transparent conducting layers. The touchscreen 162 may take other forms as well. Further, in some examples, the touchscreen 162 is configured as a display for providing output from various components of the device 100, such as the sensors 118.

The microphone 164 is configured to receive audio (e.g., a voice command or other audio input) from a user of the device 100. Similarly, the speakers 166 are configured to output audio to the user of the device 100.

The computer system 122 includes one or more processors 170 and data storage 172. In some embodiments, some components of the computer system 122 are distributed across multiple computing devices. In one embodiment, the data storage 172 is included in an external data storage device communicatively linked with the device 100. Other examples are possible as well. However, for the sake of example, the components are shown and described as part of the computer system 122.

In some examples, the computer system 122 is configured to transmit data to and/or receive data from one or more of the various components of the device 100. To this end, the computer system 122 is communicatively linked to one or more of the power supply 104, the actuators 110, the encoders 114, the control system 116, the sensors 118, and/or the peripherals 120 by a system bus, network, and/or other connection mechanism (not shown in FIG. 1).

In some examples, the computer system 122 is further configured to interact with and control one or more components of the device 100. In one example, the computer system 122 is configured to provide instructions to the control system 116 to cause the actuators 110 to adjust positions of the segments 106. In another example, the computer system 122 is configured to cause the camera 158 to capture images of the various components of the device 100. In yet another example, the computer system 122 is configured to store and execute instructions for displaying visual information on the touchscreen 162.

The processor(s) 170 comprise one or more general-purpose processors and/or one or more special-purpose processors. To the extent the processor 170 includes more than one processor, such processors work separately or in combination. In one example, a first processor of the processor(s) 170 operates the actuators 110, and a second processor of the processor(s) 170 operates the sensors 118, etc. The data storage 172, in turn, comprises one or more volatile and/or one or more non-volatile storage components, such as optical, magnetic, and/or organic storage, and the data storage 172 may be integrated in whole or in part with the processor 170.

The data storage 172 contains instructions 174 (e.g., program logic) executable by the processor 170 to perform various functions of the device 100. The data storage 172 may contain additional instructions as well, including instructions to transmit data to, receive data from, interact with, and/or control one or more of the actuators 110, the encoders 114, the control system 116, the sensors 118, the peripherals 120, and/or any other component of the device 100. The data storage 172 also includes a dataset 176. The dataset 176 includes data indicating offset angles between a reference configuration and a plurality of configurations (e.g., encoder positions associated with segment positions, etc.) of the encoder 144. In one example, the offset angles correspond to given offset angles between the deformations 149 of the second disk 148. In another example, the offset angles correspond to given offset angles between the deformations 149 and the reference configuration of the encoder 144. Although not illustrated in FIG. 1, the data storage 172 may store other data such as data collected by the encoders 114, the control system 116, and/or data from the sensors 118, etc.

In some embodiments, one or more of the actuators 110, the encoders 114, the control system 116, the sensors 118, and the peripherals 120 are configured to work in an interconnected fashion with other components within and/or outside their respective systems. Further, in some embodiments, the device 100 includes one or more elements in addition to or instead of those shown. In one example, the device 100 includes one or more additional interfaces and/or power supplies. Other additional components are possible as well. In such embodiments, the data storage 172 further includes instructions (e.g., instructions 174, etc.) executable by the processor 170 to control and/or communicate with the additional components.

Still further, while each of the components and systems are shown to be integrated in the device 100, in some embodiments, one or more components or systems are removably mounted to or otherwise connected (e.g., mechanically or electrically) to the device 100. Further, in some embodiments, the device 100 includes more, fewer, or different components than those shown in FIG. 1.

Figure 2:
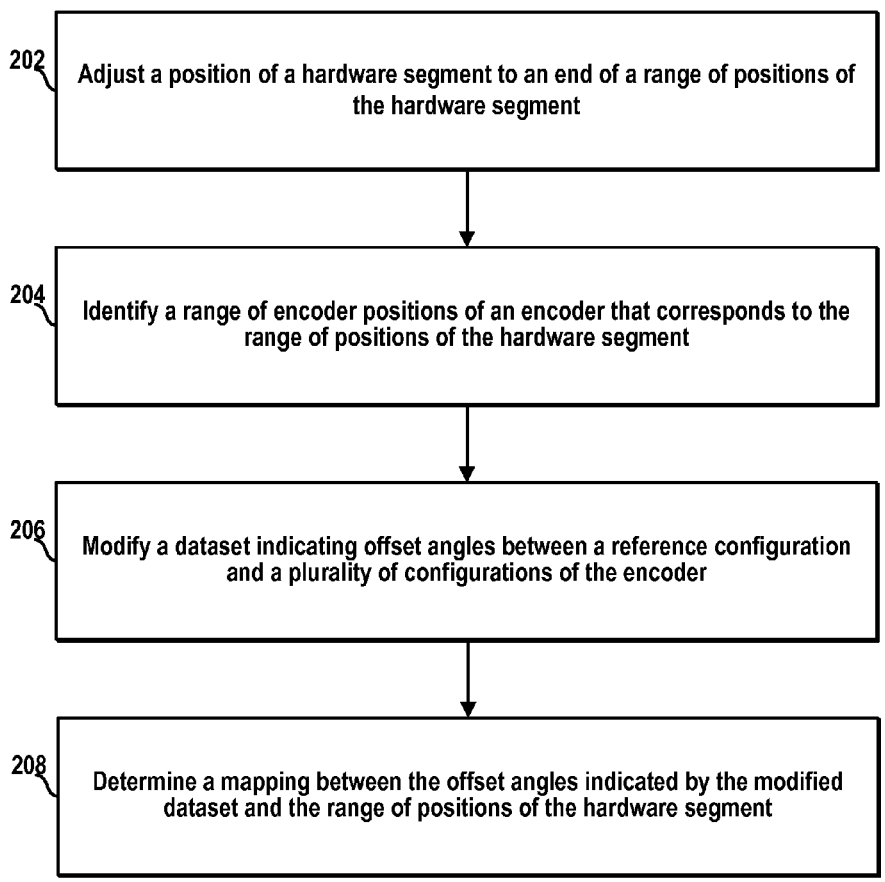
FIG. 2 is a block diagram of an example method, in accordance with at least some embodiments herein.

FIG. 2 is a block diagram of an example method 200, in accordance with at least some embodiments herein. Method 200 shown in FIG. 2 presents an embodiment of a method that could be used the device 100, for example. Method 200 may include one or more operations, functions, or actions as illustrated by one or more of blocks 202-208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

In some examples, the functions of the method 200 and other processes and methods herein are performed by a robotic device such as the device 100. In one example, the functions of the method 200 are implemented as the program instructions 174 of the device 100. Additionally or alternatively, in some examples, some or all of the functions herein are performed by an external computing device, such as a server, that is in communication with the device 100. In other examples, the external computing device communicates with the communication system 160 of the device 100 to provide instructions for the device 100 to perform some or all of the functions of the method 200. Other examples are possible as well.

At block 202, the method 200 includes adjusting a position of a hardware segment to an end of a range of positions of the hardware segment. In some embodiments, the hardware segment is similar to one or more of the segments 106, and is included in a robotic device similar to the device 100. Thus, in some examples, the hardware segment includes any combination of segments such as robotic arms, robotic joints, robotic links, robotic manipulators, etc. Further, in some examples, such robotic device includes one or more processors (e.g., controller, etc.) similar to the processor 170 of the device 100. In some examples, the hardware segment is actuated by an actuator similar to the actuators 110 of the device 100. Thus, in one example, a controller of the robotic device causes the actuator to adjust the position of the hardware segment to the end of the range of positions.

In some embodiments, the range of positions of the hardware segment is defined by a design, application, or structure of the robotic device. By way of example, consider a robotic device where the hardware segment is a rotating platform that supports various components such as sensors, cameras, etc. The rotating platform, in this example, is configured to rotate around a pre-determined position (e.g., forward direction, etc.) for any amount of rotation up to a complete rotation. However, in this example, the rotating platform only rotates away or toward the pre-determined position but not through the pre-determined position. For example, the robotic device prevents the rotation beyond the pre-determined position to avoid damage to wiring or other components connecting the rotating platform to the robotic device. In this example, the pre-determined position is the end of the range of positions of the rotating platform (e.g., the hardware segment). Example embodiments of the method 200 for detection of the end of the range of positions of the hardware segment are presented below.

In one embodiment, the method 200 includes detecting a mechanical feature (e.g., mechanical feature 108) that is positioned at the end of the range of positions of the hardware segment. Further, in this embodiment, the method 200 also includes detecting that the hardware segment is at the end of the range of positions based on the detection of the mechanical feature. By way of example, consider a document sorting device (e.g., the robotic device) that actuates a tray (e.g., the hardware segment) holding documents towards any of a plurality of bins (e.g., positions) along a path to deposit the documents. In this example, the robotic device includes a mechanical hard-stop, such as a wall, at an end of the path to prevent the tray from proceeding past the mechanical hard-stop. In this example, the end of the path is the end of the range of positions of the tray (e.g., the hardware segment). Further, in this example, the robotic device detects the mechanical feature according to various implementations. In one implementation, the robotic device determines that a respective encoder coupled to the actuator of the tray is not indicating a change in encoder position even as the actuator is receiving power. In another implementation, the robotic device detects the wall using a sensor similar to the range sensor 152, the camera 158, etc. In yet another implementation, the robotic device detects resistance to motion of the tray using a sensor similar to the IMS 150, the force sensors 154, the pressure sensors 156, etc. Other implementations are possible as well.

In another embodiment, the method 200 includes receiving an image of the hardware segment from a camera (e.g., camera 158, etc.). In this embodiment, the method 200 also includes obtaining a stored image of the hardware segment from a memory accessible to the robotic device (e.g., data storage 172, etc.). The stored image is associated with the hardware segment being at the end of the range of positions (e.g., previously captured image of the hardware segment at a time when the hardware segment was at the end of the range of positions). Further, in this embodiment, the method 200 also includes detecting that the hardware segment is at the end of the range of positions based on a comparison between the image and the stored image. By way of example, consider a liquid deposition device (e.g., the robotic device) that includes a manipulator (e.g., the hardware segment) that places a drop of liquid on a substrate. In this example, the device includes a camera that captures an image (or multiple images) of the manipulator as the device positions the manipulator at a certain distance above the substrate. Further, in this example, the device accesses a memory in a remote server (or a local memory) that includes the stored image of the manipulator at an appropriate distance to the substrate for releasing the drop of liquid, and compares the stored image with the image(s) from the camera to detect the manipulator being at the end of the range of positions (e.g., at the appropriate distance).

In yet another embodiment, the method 200 includes receiving data from a sensor (e.g., IMS 150, range sensor 152, force sensor 154, pressure sensor 156, an inclinometer, etc.) indicative of the position of the hardware segment, and detecting that the hardware segment is at the end of the range of positions based on the data from the sensor. By way of example, consider an assembly robot (e.g., the robotic device) that includes a robotic arm (e.g., the hardware segment) for fastening bolts onto an object in an assembly line. In this example, another similar robotic device is positioned adjacent to the robotic device. To avoid damage to the adjacent robotic device, in this example, the robotic device includes an infrared (IR) range sensor positioned to sense objects at a threshold distance to the adjacent robotic device. In this example, as the robotic device adjusts the position of the robotic arm, the IR sensor signals that the robotic arm is at the threshold distance, and the robotic device thereby identifies the position of the robotic arm associated with the IR sensor signal as the end of the range of positions of the robotic arm.

As a variation of the embodiment above by way of example, the robotic arm (e.g., hardware segment) includes an inclinometer that provides data indicative of the position of the robotic arm. The data, in this example, indicates a slope or angle between the hardware segment (i.e., the robotic arm) and gravity. Thus, by using this data, the robotic device (i.e., the assembly robot) may determine the position of the robotic arm at the end of the range of positions that corresponds to a particular angle/slope with respect to gravity.

Other position detection techniques and methods are possible as well and may be adapted for the method 200 in accordance with the present disclosure.

In some embodiments, the method 200 includes adjusting the position of the hardware segment to another end of the range of positions. As a variation of the assembly robot example above, the robotic arm includes multiple links and joints coupled to one another in a particular arrangement. In this example, a given link of the robotic arm is the hardware segment actuated by the robotic device to rotate about a joint. According to the particular arrangement, the given link is adjacent to two other components of the robotic device, and therefore the range of possible positions of the given link is defined at two ends of the rotation about the joint by positions of the two adjacent components. Thus, in this example, the end of the range of positions is associated with the position of one of the adjacent components, and the other end of the range of positions is associated with the position of the other adjacent component.

At block 204, the method 200 includes identifying a range of encoder positions of an encoder that corresponds to the range of positions of the hardware segment. In some examples, the encoder is similar to the encoders 114 of the device 100. Thus, in one example, the encoder is a rotary encoder that rotates about an encoder axis responsive to the adjustment of the position of the hardware segment at block 202.

Further, in some examples, the encoder is coupled to the actuator that actuates the hardware segment. Moreover, in these examples, the encoder provides data indicative of motion (e.g., speed, direction of motion, etc.) or orientation (e.g., rotational position, displacement position, etc.) of the actuator. In turn, the data provided by the encoder is indicative of the position of the hardware segment actuated by the actuator. In one example, the encoder provides encoder values (e.g., pulses, biases, etc.) that indicate a change in the configuration of the encoder by a given amount (and a respective change in the position of the hardware segment) similarly to the incremental encoder 140 and/or the quasi-absolute encoder 144. In one example, the robotic device (or the encoder) maintains a counter that counts pulses/signals from the encoder and assigns encoder values (e.g., biases) based on the counted signals. In this example, the robotic device (or the encoder) may reset the counter every time the encoder completes a full rotation about the encode axis (e.g., in response to receiving an index signal from the encoder, etc.).

In line with the discussion above, for example, the robotic device identifies the range of encoder positions at block 204 by detecting an encoder value (e.g., bias, etc.) of the encoder responsive to the adjustment of the position of the hardware segment to the end of the range of positions at block 202. To this end, for example, the robotic device determines a range of encoder values that are terminated by the detected encoder value. In one example, the robotic device obtains instructions (e.g., from data storage 172) indicating that the range of encoder positions corresponds to a particular number of encoder ticks (e.g., 50 encoder ticks). In this example, if the end of the range of positions of the hardware segment corresponds to an encoder value of 75, the range of encoder values that correspond to the range of encoder positions is 25 to 75. As a variation of this example, if the instructions indicate that the range of encoder positions is the entire range of encoder positions of the encoder, then the range of encoder values would be 75 to 74 (e.g., including the encoder value of zero). In another example, where the range of positions of the hardware segment includes a lower bound and an upper bound (e.g., mechanical hard-stops, etc.), the robotic device detects encoder values for both bounds (e.g., by adjusting the position of the hardware segment to both ends of the range of positions) and determines the range of encoder values between the lower bound and the upper bound.

Accordingly, in some embodiments, the method 200 includes detecting an encoder value from the encoder responsive to the adjustment of the position of the hardware segment. In these embodiments, the identification of the range of encoder positions of the encoder that correspond to the range of positions of the hardware segment at block 204 is based on the detected encoder value.

In an example embodiment, the robotic device associates the encoder values to encoder positions of the encoder relative to a reference configuration. The reference configuration, for instance, can be associated with the encoder being at a particular encoder position about the encoder axis that corresponds to a particular position of the hardware segment. For example, where the encoder includes a particular number of deformations (e.g., deformations 147), the encoder assigns an encoder position to each encoder value. For example, where the encoder provides 100 pulses per complete rotation, a given encoder position relative to the reference configuration of the encoder may be determined as (given encoder position=[encoder value]*$2\pi$/100 radians). In this example, the reference configuration has an encoder value of zero. However, in other examples, the reference configuration can have any other encoder value (e.g., given encoder position=([encoder value]−[encoder value of reference configuration])*$2\pi$/100 radians).

In practice, for example, the reference configuration is defined during manufacture, assembly, installation, and/or configuration of the encoder. As an example, where the encoder is an incremental encoder (e.g., encoder 140), the reference configuration typically corresponds to the encoder position of the encoder associated with an index signal received from the incremental encoder.

However, in other examples herein, the reference configuration corresponds to an arbitrary encoder position of the encoder. Referring back to FIG. 1 by way of example, consider the quasi-absolute encoder 144 of the device 100. In this example, the reference configuration is defined as a particular encoder position of the second disk 148, and the offset angles are angles from the particular encoder position to the deformations 149. During assembly of the encoder 144, the second disk 148 is coupled to the first disk 146 in an arbitrary arrangement, for example. Due to such coupling variability, the particular encoder position of the second disk 148 corresponds to the arbitrary reference configuration of the encoder 144, which may vary between two similarly assembled encoders.

In accordance with the present disclosure, in some examples, the offset angles between a plurality of configurations of the encoder and the reference configuration are indicated by a dataset (e.g., the dataset 176) accessible to the robotic device. In one example, a given offset angle is indicated as a number of encoder ticks between the reference configuration and a given configuration of the plurality of configurations. In another example, the given offset angle is indicated as a particular angle to the reference configuration. In yet another example, the given offset angle is indicated as any value mapped to the given offset angle. In still another example, the given offset angle is indicated as an angle (or number of encoder ticks) to an adjacent configuration of the plurality of configurations (e.g., previous index signal). Other examples are possible as well and are described in greater detail within exemplary embodiments herein. Thus, in some examples, the robotic device utilizes the dataset to identify configurations of the encoder that correspond to the plurality of index signals, and to thereby associate the range of encoder values with the range of configurations of the encoder that correspond to the range of positions of the hardware segment.

Specifically, in some embodiments, the method 200 includes detecting at least two index signals and corresponding encoder values from the encoder responsive to the adjustment of the position at block 202. In these embodiments, a given index signal is indicative of the encoder being at a given configuration of the plurality of configurations indicated in the dataset. Further, in these embodiments, the method 200 includes identifying at least one offset angle indicated by the dataset that is associated with one or more of the at least two index signals. Moreover, in these embodiments, the method 200 includes associating a range of encoder values with the plurality of configurations of the encoder based on the identified at least one offset angle and the detected corresponding encoder values.

At block 206, the method 200 includes modifying a dataset indicating offset angles between a reference configuration and a plurality of configurations of the encoder. Table 1 illustrates an example dataset.

TABLE 1

| Configurations | Offset Angles |
|---|---|
| A | 3 |
| B | 8 |
| C | 15 |
| D | 24 |
| E | 36 |

As shown in Table 1, the plurality of configurations A, B, C, D, E are associated with respective offset angles to a reference configuration. In one example, the offset angles shown in Table 1 are a number of encoder ticks to the reference configuration in a given direction (e.g., clockwise or anticlockwise). In another example, the offset angles in Table 1 are a number of angular degrees to the reference configuration. Other examples are possible as well (e.g., look-up table value, etc.). Further, in Table 1, the reference configuration may correspond to any particular encoder position of the encoder such as the encoder positions associated with configurations A-E or any other configuration not indicated on Table 1. However, for the sake of this example, consider the configuration E as the reference configuration, and the offset angles represented as a number of sectors (e.g., slices, fractions, etc.) in a circle that includes 36 equally-sized sectors. Thus, for example, the configuration A is at a first offset angle of (360°/36*3=30°) in an anticlockwise direction to the configuration E, the configuration B is at a second offset angle of (360°/36*8=80°) in an anticlockwise direction to the configuration E, . . . , and the configuration E is at a given offset angle of (360°/36*36=360°) in an anticlockwise direction to itself (i.e., complete rotation) which also corresponds to the offset angle of 0° (i.e., the discontinuity).

In some embodiments, the plurality of configurations A-E shown in Table 1 correspond to the deformations 149 of the encoder 144 of the device 100. Therefore, in some examples, the offset angles shown in Table 1 are provided by a manufacturer/provider of the second disk 148 of the encoder 144. As an example, if the second disk 148 is a printed sticker, the offset angles between the various deformations 149 are measured and provided with the printed sticker (e.g., on a computer readable medium, etc.). In this example, multiple printed stickers are manufactured and provided with the same dataset. In turn, the configuration E of each printed sticker is associated with a different reference configuration and a different corresponding encoder position of a respective encoder when the second disk 148 is coupled to the first disk 146. Further, as illustrated in Table 1, adjacent configurations of the plurality of configurations A-E are separated by different offset angles. Accordingly, in some embodiments, the dataset is utilized to identify the range of encoder positions at block 204 upon detection of any two of the configurations A-E (e.g., detection of corresponding index signals). Although Table 1 shows five configurations A-E, in some embodiments, the plurality of configurations include more or less configurations.

In line with the discussion above, if the range of encoder positions identified at block 204 includes the encoder position associated with configuration E shown in Table 1, a discontinuity (0/36) exists in the offset angles describing the range of encoder positions. Continuing with the example above, consider that the end of the range of positions of the hardware segment identified at block 204 corresponds to the offset value of 20 (not shown in Table 1). Various embodiments of the method 200 to modify the dataset at block 204 to adjust the reference configuration and/or the offset angles are presented below.

In a first embodiment, modifying the dataset at block 204 comprises adjusting the reference configuration to correspond to an encoder position of the encoder associated with the hardware segment being at the end of the range of positions. Accordingly, in this embodiment, Table 2 illustrates two example modifications to the dataset.

TABLE 2

| Configurations | Original Offset Angles | First Modification | Second Modification |
|---|---|---|---|
| A | 3 | −17 | 19 |
| B | 8 | −12 | 24 |
| C | 15 | −5 | 31 |
| D | 24 | 4 | 4 |
| E | 36 | 16 | 16 |

As shown in Table 2, the two example modifications assign the offset angle of 20 (not shown) of the end of the range of encoder positions as the reference configuration (i.e., having the encoder position/value of 0/36). For the first example modification in the third column of Table 2, the offset angle of 20 is subtracted from the respective original offset angles of the configurations A-E. As shown, the offset angle of configuration A is modified to be (3−20=−17), the offset angle of configuration B is modified to be (8−20=−12), etc. For the second example modification in the fourth column of Table 2, the negative values in the first example modification are adjusted to be positive offset angles to the assigned reference configuration by adding 36 (i.e., the number of offset angle values for a complete rotation). As shown, the offset angle of configuration A is modified to be (−17+36=19), etc. In both example modifications, the dataset of Table 1 is rotated such that the reference configuration (e.g., the discontinuity) corresponds to the end of the range of encoder positions identified at block 204, for example. For example, as shown in Table 2, the discontinuity that originally existed between configurations A and E (e.g., at configuration E as shown in column 2 of Table 2) is modified to be between configurations C and D (columns 3 and 4 of Table 2). Further, the modified dataset in both cases still indicates the unique distances between adjacent configurations of the configurations A-E.

In a second embodiment, modifying the dataset at block 204 comprises adjusting the reference configuration to correspond to an encoder position of the encoder outside the range of encoder positions. In line with the discussion above, some embodiments herein include the hardware segment bound at both ends of the range of positions and not just on one end (e.g., link that moves between a minimum position and a maximum position). In these embodiments, the range of encoder positions that corresponds to the range of positions of the hardware segment also has two ends such that the encoder does not perform a complete rotation about the encoder axis. Continuing with the example above, consider a scenario where the hardware segment has a minimum position that corresponds to the original offset value of 35 (not shown in Table 2) as well as the maximum position for the end of range of encoder positions (e.g., the original offset value of 20). In this scenario, the encoder begins at the original offset value of 35 and rotates anticlockwise through the configurations E, A, B, C in that order without ever reaching the configuration D to reach the original offset value of 20. In this scenario and in accordance with the second embodiment, any of the original offset values 21-34 is selected as the reference configuration. Similarly, the two example modifications in Table 2 are also possible for the second embodiment to reflect such reference configuration outside the range of encoder positions. Table 3 illustrates the two example modifications for the second embodiment where the configuration D (outside the range of encoder positions) is selected as the reference configuration.

TABLE 3

| Configurations | Original Offset Angles | First Modification | Second Modification |
| --- | --- | --- | --- |
| A | 3 | −21 | 15 |
| B | 8 | −16 | 20 |
| C | 15 | −11 | 27 |
| D | 24 | 0 | 0 |
| E | 36 | 12 | 12 |

In a third embodiment, modifying the dataset at block 204 comprises adjusting the reference configuration to correspond to an encoder position associated with the hardware segment being at a home position within the range of positions of the hardware segment. As a variation of the scenario above by way of example, the hardware segment is configured to return to the home position (e.g., initial position, default position, etc.) that is selected according to an application of the robotic device. In this example, the robotic device receives requests to adjust the position of the hardware segment relative to the home position. In accordance with the third embodiment, the home position is assigned an offset angle of zero, positions along a first direction from the home position to the end of the range of positions are assigned positive offset angles, and positions along a second direction from the home position to the end of range of positions (or to a second end of the range of positions) are assigned negative values. Consider, by way of example, a scenario where the home position of the hardware segment corresponds to the original offset angle of 10, and the end of the range of positions corresponds to the original offset value of 20. Table 4 illustrates example modifications to the dataset according to the third embodiment.

TABLE 4

| Configurations | Original Offset Angles | Shifted Offset Angles | Home Position Bias Applied |
| --- | --- | --- | --- |
| A | 3 | 3 | −7 |
| B | 8 | 8 | −2 |
| C | 15 | 15 | 5 |

TABLE 4-continued

| Configurations | Original Offset Angles | Shifted Offset Angles | Home Position Bias Applied |
| --- | --- | --- | --- |
| D | 24 | −12 | −22 |
| E | 36 | 0 | −10 |

As shown in Table 4, the modification of the dataset according to the third embodiment is performed over two stages. In one stage (column 3 of Table 4), original offset angles greater than the end of the range of encoder positions are shifted by 36 (i.e., the offset angle that corresponds to a complete rotation of the encoder). In another stage (column 4 of Table 4), the bias of the home position is subtracted (i.e., the offset angle of 10) from the shifted offset angles. Through this process, the dataset is modified according to the third embodiment. For instance, the configuration C has a positive offset value of 5, and as the encoder rotates in the positive direction from the home position (e.g., encoder value or offset angle value of zero) through the configuration C and towards the end of the range of positions of the hardware segment that is associated with a maximum positive encoder value of 10 (not shown in Table 4). On the other hand, as the encoder rotates away from the home position in the negative direction towards the end of the range of possible encoder positions, the offset angle values are negative (e.g., configurations B, A, E, D in that order). The two stages illustrated in Table 4 can be performed in any order or in parallel. Alternatively, other process(es) are also possible to perform the modifications such that the dataset is modified in accordance with the fourth column of Table 4.

To facilitate operation of the robotic device in accordance with the third embodiment, in some examples, the method 200 includes receiving an input indicative of the hardware segment being at the home position, and responsively identifying a given encoder position that corresponds to the hardware segment being at the home position.

At block 208, the method 200 includes determining a mapping between the offset angles indicated by the modified dataset and the range of positions of the hardware segment. Continuing with the example above, the original offset angles shown in Table 4 are indicative of distances between the various configurations A-E of the encoder. However, the original offset angles may correspond to any position of the hardware segment. In the example above, the end of the range of positions of the hardware segment corresponds to the original offset angle 20. However, in other examples, the original offset angle that corresponds to the end of range of positions of the hardware segment corresponds to any other value based on how the encoder is coupled to the hardware segment. In some examples, the encoder is coupled at a given orientation of the encoder to the hardware segments. Thus, in these examples, the range of encoder positions determined at block 204 are associated with the range of positions of the hardware segments based on the given orientation of the encoder. Illustrative examples are provided within exemplary embodiments herein.

Accordingly, in some embodiments, the method 200 is performed as a calibration process to associate positions of the hardware segment with the range of encoder positions of the encoder by adjusting the reference configuration in the mapping. Specifically, in some examples, the method 200 includes detecting at least two index signals and corresponding encoder positions from the encoder responsive to the adjustment of the position of the hardware segment at block 202, identifying at least one offset angle indicated by the dataset that is associated with one or more of the at least two index signals, associating the range of encoder positions (e.g., terminated by an encoder value of the end of the range of positions) with the plurality of configurations of the encoder based on the identified at least one offset angle and the detected corresponding encoder values, and determining the mapping at block 208 based on the association.

In some examples, the method 200 includes receiving a request to adjust the position of the hardware segment to a given position within the range of positions (e.g., from a user or other system in communication with the robotic device). In these examples and/or other examples, the method 200 includes adjusting the position of the hardware segment to the given position based on the mapping. In one example, the robotic device of the present method utilizes the mapping (e.g., Tables 2-4, etc.) to identify a particular encoder value and/or a particular encoder configuration that corresponds to the given position, and then causes the actuator of the hardware segment to adjust the position of the hardware segment accordingly.

In some examples, the method 200 includes receiving a request to adjust the position of the hardware segment to a particular position relative to the home position. In these examples, the method 200 includes adjusting the position of the hardware segment based on the mapping (e.g., column 4 of Table 4). For example, as shown in Table 4, the mapping represents the offset angles by positive values for first positions of the hardware segment in a first direction relative to the home position (e.g., configuration C in Table 4), negative values for second positions of the hardware segment in a second direction relative to the home position (e.g., configurations A, B, D, E in Table 4), and a value of zero for the home position of the hardware segment. In turn, for example, the robotic device utilizes such mapping to adjust the position of the hardware segment to the particular position relative to the home position.

Figure 3A:
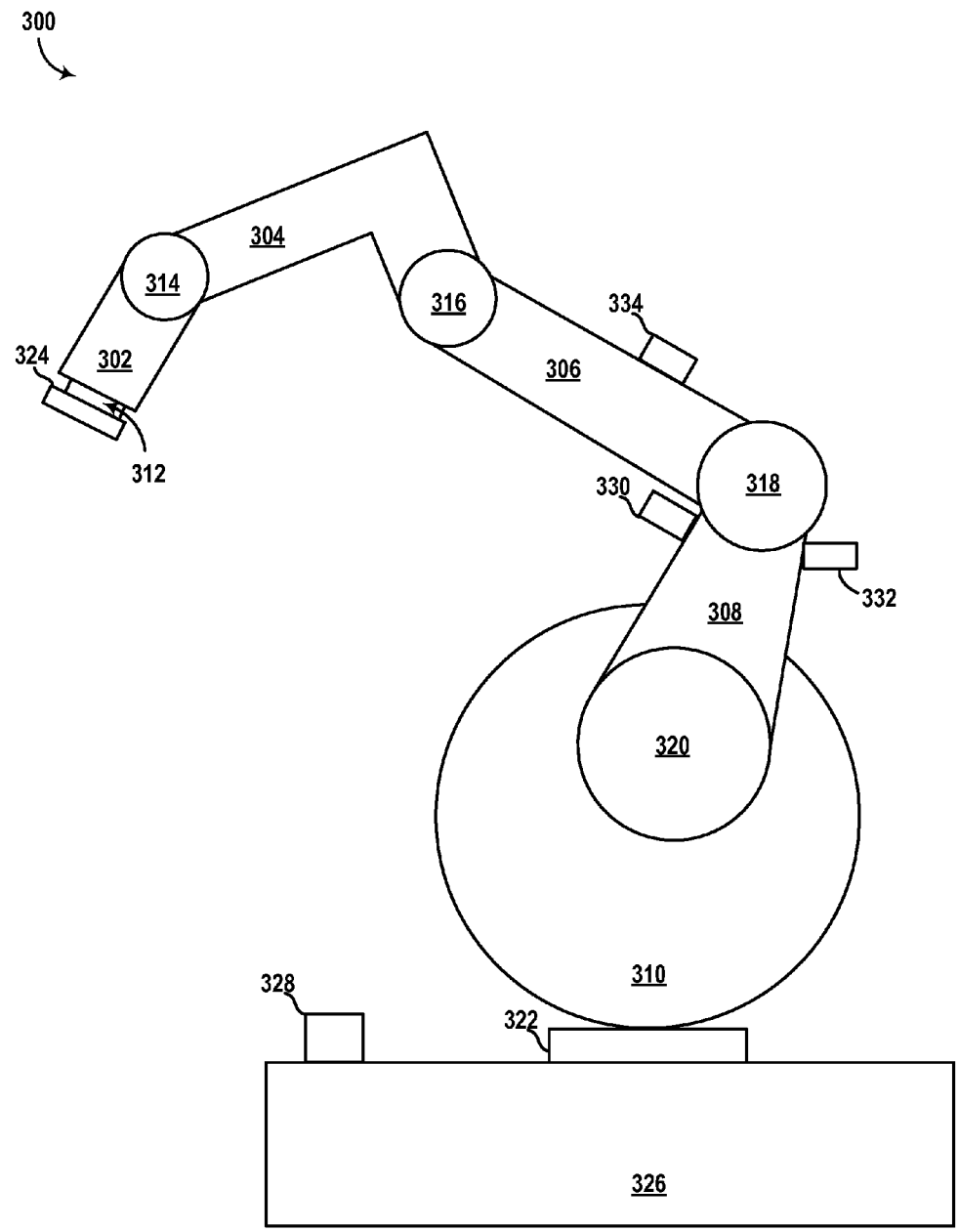
FIG. 3A illustrates an example robotic device, in accordance with at least some embodiments herein.

FIG. 3A illustrates an example robotic device 300, in accordance with at least some embodiments herein. In some embodiments, the device 300 is similar to the device 100 of FIG. 1, and is configured to perform functions of the method 200 of FIG. 2. As shown, the device 300 includes robotic links 302-310, robotic joints 312-322, robotic manipulator 324, frame 326, sensor 328, and mechanical features 330-332 that are similar, respectively, to the robotic link 130, the robotic joint 132, the robotic manipulator 134, the frame 102, the sensors 118, and the mechanical features 108 of the device 100. Additionally, as shown, the device 300 includes an inclinometer 334.

The links 302-310 are formed from any solid material (e.g., metals, alloys, plastics, etc.) and have any shape according to various applications of the device 300. For example, as shown, the link 304 has an L-shape, the links 302, 306 have a rectangular shape, and the link 310 has a circular (e.g., spherical, etc.) shape. Other shapes are possible as well.

The joints 312-322 are configured to allow motion of the manipulator 324, the links 302-310, and/or other components of the device 300 relative to one another. For example, as shown, the joint 314 allows motion of the link 302 relative to the link 304, the joint 316 allows motion of the link 304 relative to the link 306, the joint 318 allows motion of the link 306 relative to the link 308, and the joint 320 allows motion of the link 308 relative to the link 310. Further, in one example, the joint 312 allows the manipulator 324 to rotate about an axis perpendicular to a surface of the link 302, and the joint 322 allows the link 310 to rotate about an axis perpendicular to a surface of the frame 326. In another example, the joint 312 allows the manipulator 324 to move linearly along the axis perpendicular to the surface of the link 302.

In practice, for example, the device 300 includes a plurality of actuators (not shown) coupled to the various links/manipulators to actuate the respective links/manipulators about the respective joints 312-322.

The manipulator 324 includes any manipulator configured to interact with an environment of the device 300. In one example, the manipulator 324 is a magnetic tool that is activated to attract metallic objects in the environment of the device 300. However, in some examples, the manipulator 324 includes or is coupled to any other manipulator such as a robotic grasping tool or other end-effector.

The frame 326 includes any solid material (e.g., metal, plastic, wood, etc.) that has physical properties to allow supporting the various components of the device 300. Further, in some examples, the frame 326 has any shape or form suitable other than that shown in FIG. 3A according to various applications of the device 300.

The sensor 328 is configured to provide data pertaining to the various components of the device 300. In one example, the sensor 328 is a camera (e.g., camera 158) configured to capture an image of some or all the components of the device 300. In another example, the sensor 328 is a range sensor (e.g., range sensor 152) configured to measure a distance to one or more of the components of the device 300. Further, in some examples, the sensor 328 is arranged in other locations than that shown in FIG. 3A. In one example, the sensor 328 is a force sensor (e.g., force sensor 154) positioned between two links to measure a force between the two links. Although not shown in FIG. 3A, in some examples, the device 300 also includes an actuator coupled to the sensor 328 and configured adjust a viewing angle of the sensor 328.

The mechanical features 330-332 include any mechanical feature coupled to the device 300. For example, as shown, the features 330 and 332 are mechanical hard-stops that prevent the link 306 from rotating beyond particular positions about the joint 318. In some examples, the features 330 and 332 are indentations, ridges, solid structures, or any other mechanical feature to affect motion of the components of the device 300. In some examples, the device 300 includes more or fewer mechanical features than those shown in FIG. 3A. In one example, the device 300 alternatively only includes one mechanical feature (e.g., feature 330) and not the other mechanical feature (e.g., feature 332). Further, in some examples, the mechanical features 330-332 are alternatively embedded inside any of the components of the device 300. In one example, the mechanical features 330-332 are included in the joint 318 to define one or more ends of the range of positions of the link 306.

The inclinometer 334 includes an accelerometer or any other sensor configured to provide data indicative of the position of the link 306. The data, for example, may indicate an angle between a flat surface of the inclinometer 334 (e.g., the surface shown coupled to the link 306) and gravity. The angle can be then used by the device 300 to determine a position of the link 306 relative to the joint 318.

An example scenario that involves the device 300 performing the functions of the method 200 is as follows. In the scenario, the device 300 adjusts a position of the link 304 by rotating the link 304 about the joint 316. During the adjustment, the device 300 utilizes the sensor 328 to detect that the link 304 is at one or more ends of a range of positions of the hardware segment defined by a design of the device 300. For instance, an end of the range of positions may be selected to avoid contact between the manipulator 324 and the link 310. In one example, where the sensor 328 is a camera (e.g., camera 158), the camera captures one or more images of the link 304 during the adjustment of the position, and compares the captured image with a stored image to detect that the link 304 is at the end of the range of positions. In another example, where the sensor 328 is a range sensor (e.g., range sensor 154) or an IMS (e.g., IMS 150), the range sensor measures a distance to the link 304, and the device 300 determines that the link 304 is at the end of the range of positions based on the range sensor measurement. In yet another example, where the sensor 328 is a force sensor (e.g., force sensor 154) or a pressure sensor (e.g., pressure sensor 156), the sensor 328 measures resistance to motion of the link 304 (e.g., due to configuration of the joint 316) to determine that the link 304 is at the end of the range of positions. In these examples, the device 300 responsively identifies a range of encoder positions of an encoder (not shown) coupled to an actuator (not shown) of the joint 316, and determines a mapping between the range of encoder positions of the encoder and the range of positions of the hardware segment in accordance with the method 200.

Figure 3B:
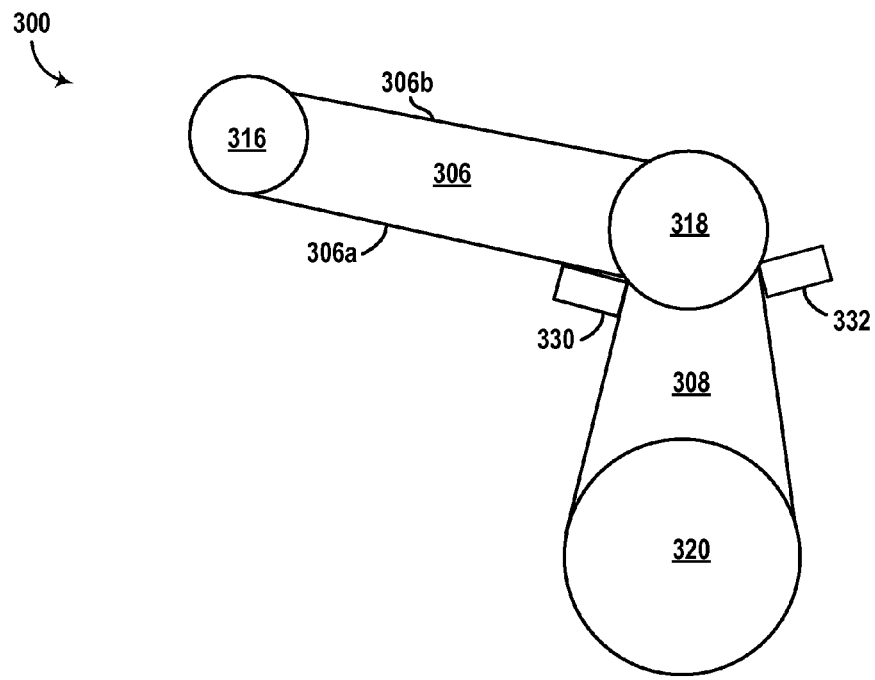
FIGS. 3B-3D illustrate example positions of the segment of the device of FIG. 3A.
Figure 3C:
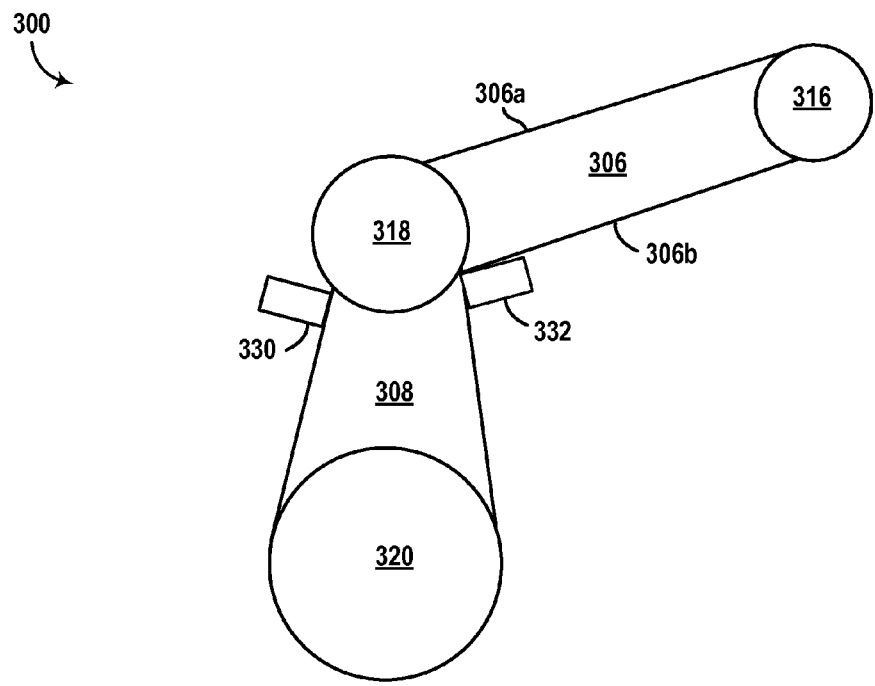
Figure 3D:
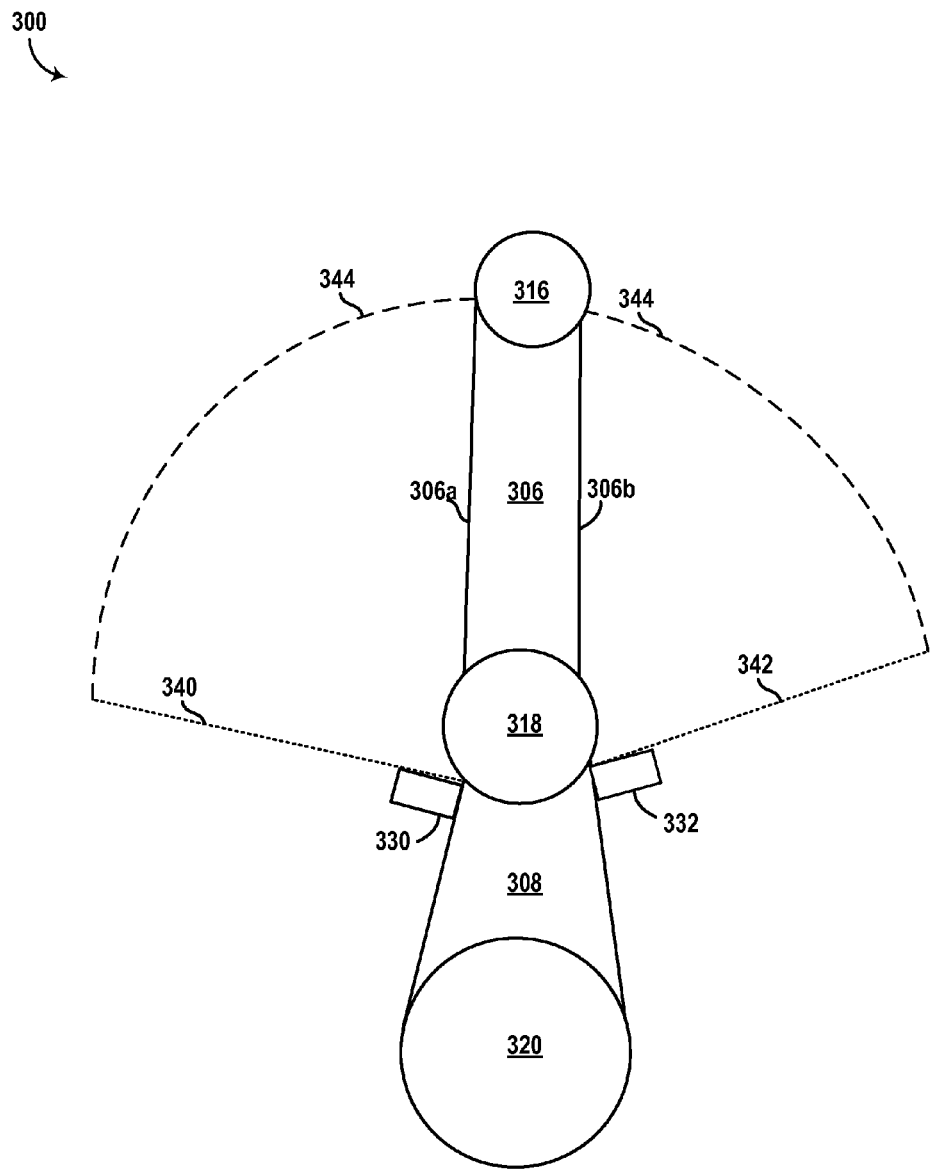

FIGS. 3B-3D illustrate example positions of the segment 306 of the device 300 of FIG. 3A. It is noted that some of the components of the device 300 are omitted from the FIGS. 3B-3D for illustrative purposes.

Accordingly, another example scenario that involves the device 300 performing the functions of the method 200 is as follows. In the scenario, the device 300 adjusts a position of the link 306 by rotating the link 306 about the joint 318 in an anticlockwise direction towards the mechanical feature 330. The link 306 is prevented from moving past the mechanical feature 330 due to a side 306a of the link 306 contacting the feature 330 as illustrated in FIG. 3B. In the scenario, the device 300 then obtains an encoder value of an encoder (not shown) in the joint 318 for the encoder configuration in the arrangement illustrated in FIG. 3B. Next, in the scenario, the device 300 adjusts the position of the link 306 in a clockwise direction towards the feature 332 (side 306b similarly prevents the link 306 from moving further). In turn, another encoder value is detected for the encoder configuration in the arrangement illustrated in FIG. 3C. Thus, a range of encoder positions of the encoder is determined that is terminated at both ends by the detected encoder values. As shown in FIG. 3D, the device 300 then determines a range of positions 344 of the link 306 that has a minimum position 340 at a first end of the range of positions 344 and a maximum position 342 at a second end of the range of positions 344. In line with the discussion above, the device 300 also determines a mapping between the range of positions 344 and the determined range of encoder positions.

Figure 4:
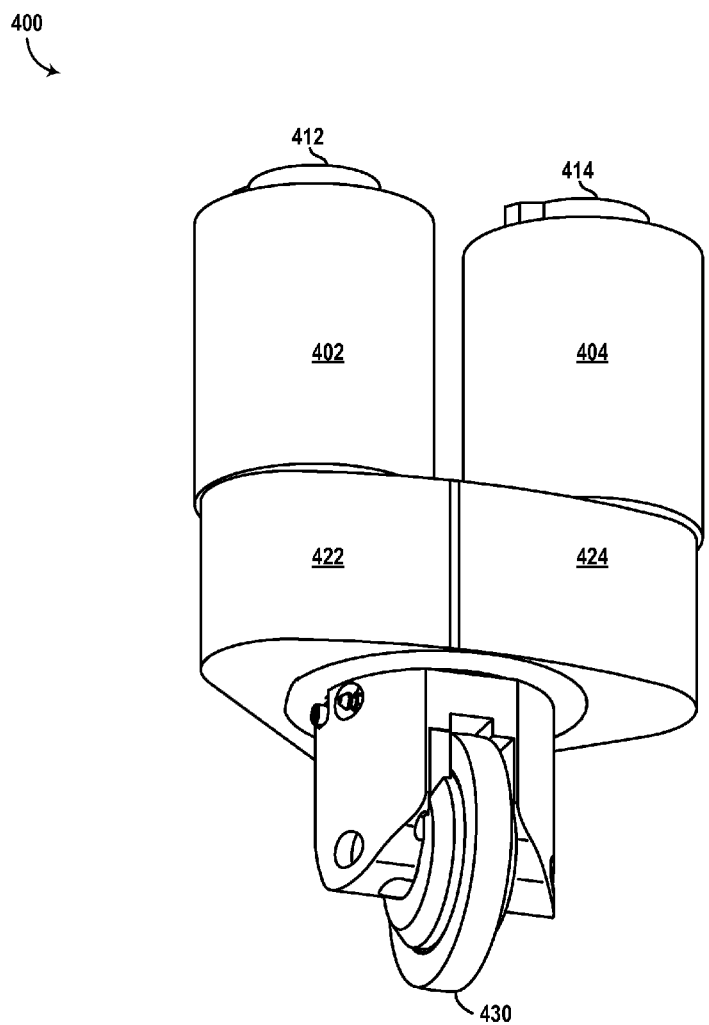
FIG. 4 illustrates another example robotic device, in accordance with at least some embodiments herein.

FIG. 4 illustrates another example robotic device 400, in accordance with at least some embodiments herein. In some embodiments, the device 400 is similar to the device 100 and includes some or all the components thereof. As shown, the device 400 includes actuators 402-404, encoders 412-414, gears 422-424, and wheel 430 that are similar, respectively, to the actuators 110, encoders 114, gears 112, and wheel 138 of the device 100.

As shown, the actuators 402-404 actuate the wheel 430 along two degrees-of-freedom. For instance, the actuator 402 rotates the wheel 430 about a rolling axis (e.g., forward or backward), and the actuator 404 rotates the wheel 430 about a steering axis to steer the wheel. Thus, in some embodiments, multiple actuators are coupled to the same segment (e.g., the wheel 430) as illustrated in FIG. 4. However, in other embodiments (not shown), a single actuator is coupled to each segment.

As illustrated, when the actuators 402-404 rotate, the gears 422-424 provide a gear ratio between rotations of the actuators 402-404 and rotations of the wheel 430 about respective axis of the wheel 430. In turn, the encoders 412-414 measure the rotation of the actuators 402-404 and provide encoder values indicating motion and/or orientation of the actuators 402-404.

An example scenario where the device 400 performs functions of the method 200 is as follows. The device 400 rotates the wheel 430 to a particular steering angle that is selected as an end of a range of positions of the wheel 430 (e.g., forward direction). The device 400 may then measure an encoder value for position of the actuator 404 associated with the particular steering angle. In line with the discussion above, for example, the device 400 then modifies a dataset (e.g., dataset 176) that associates offset angles of the encoder 414 with positions of the wheel 430 such that the offset angles increase for an anticlockwise rotation of the wheel 430, decrease for a clockwise rotation of the wheel 430, and have a value of zero for the particular steering angle.

Figure 5A:
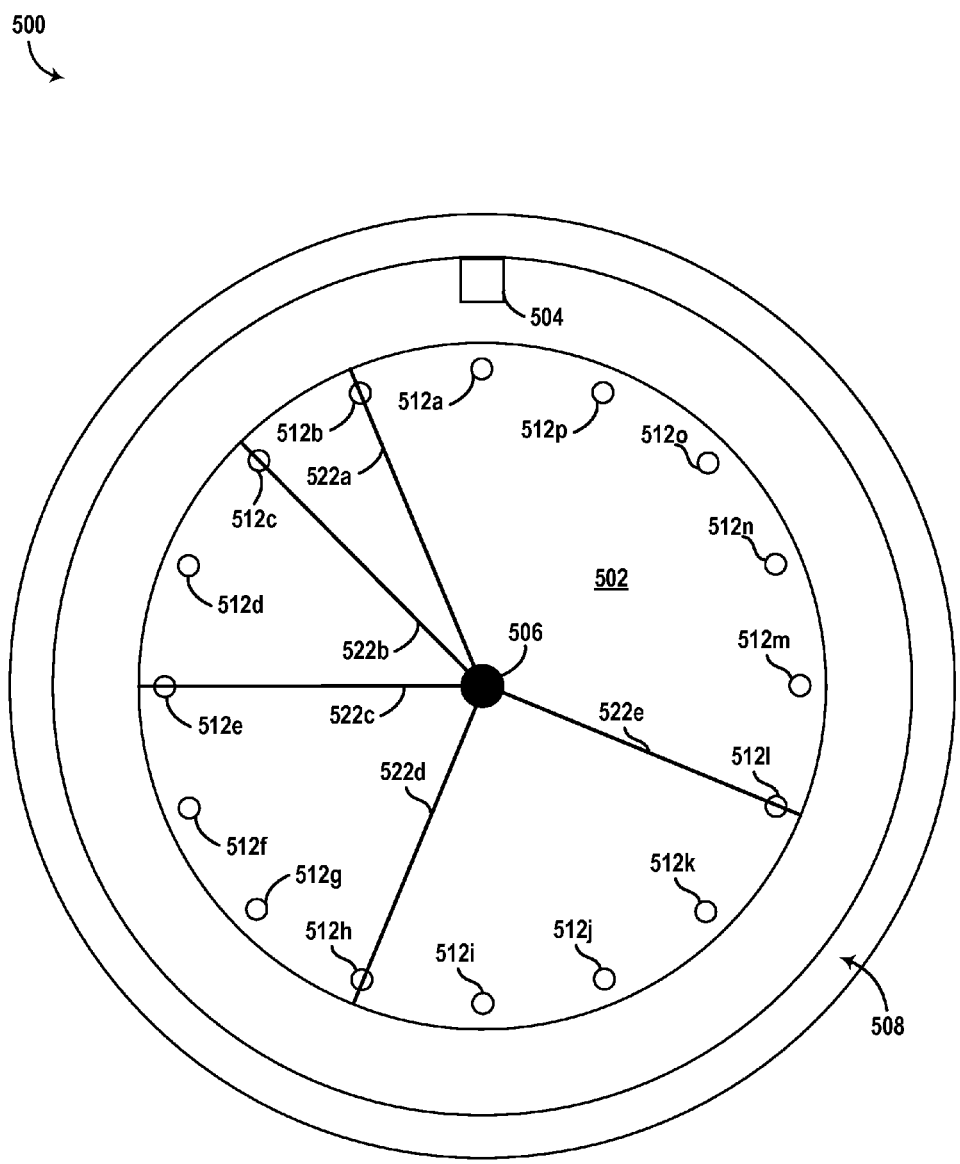
FIG. 5A illustrates an example encoder, in accordance with at least some embodiments herein.

FIG. 5A illustrates an example encoder 500, in accordance with at least some embodiments herein. In some embodiments, the encoder 500 is similar to the encoders 114 of the device 100 and/or the encoders 402-404 of the device 400. In one example, the illustration in FIG. 5A corresponds to a cross-section view of one of the encoders 402-404. As shown, the encoder 500 includes a rotary device 502, a detector 504, a shaft 506, and a casing 508.

The rotary device 502 has a circular shape and is mounted to the shaft 506 to rotate about the shaft 506 (e.g., the encoder axis). Further, as shown, the rotary device 502 includes a first plurality of deformations 512a-512p and a second plurality of deformations 522a-522e that are similar, respectively, to the deformations 147 and the deformations 149 of the encoder 144. Accordingly, in some examples, the encoder 500 is configured as a quasi-absolute encoder similarly to the encoder 144. As shown, the deformations 512a-512p are sixteen deformations and the deformations 522a-522e are five deformations. However, in some embodiments, the deformations 512a-512p and/or the deformations 522a-522e include any other number of deformations according to a configuration of the encoder 500.

The detector 504 includes any detector configured to detect the deformations 512a-512p when one of the deformations 512a-512b is aligned with the detector 504. As illustrated in FIG. 5A, for example, the deformation 512a is aligned with the detector 504. In one example, where the encoder 500 is a mechanical encoder, the deformations 512a-512p are openings in a solid disk (e.g., the rotary device 502) and the detector 504 detects such openings (e.g., range sensor, etc.). In another example, where the encoder 144 is an optical encoder, the deformations 512a-512p are transparent/opaque/reflective areas of the rotary device 502 and the detector 504 is an optical detector (e.g., camera, light detector, etc.) that detects such areas. In yet another example, where the encoder 500 is a magnetic encoder, the deformations 512a-512p are magnetic poles and the detector 504 is a magnetic sensor (e.g., coil, etc.). In still another example, where the encoder 500 is a capacitive encoder, the deformations 512a-512p are asymmetrically shaped deformations that adjust a capacitance between the detector 504 and the rotary device 502 (e.g., the detector 504 is a capacitive sensor). Other examples are possible as well. Similarly, the detector 504 is configured to detect the deformations 522a-522e that are formed similarly to the deformations 512a-512p. In one embodiment, the detector 504 includes a combination of detectors, where one detector (e.g., magnetic) detects the deformations 512a-512b and another detector (e.g., optical) detects the deformations 522a-522e. In another embodiment, the detector 504 is a single detector that is configured to detect both the deformations 512a-512p and the deformations 522a-522e while distinguishing the type of deformation. By way of example, the encoder 500 in this embodiment outputs an encoder pulse (e.g., bias, value, etc.) that corresponds to any of the deformations 512a-512p being aligned with the detector 504. Further, in this embodiment, the encoder 500 outputs an index signal to indicate detection of any of the deformations 522a-522e. For example, in the illustration of FIG. 5A, if the rotary device 502 rotates in an clockwise direction, the encoder 500 provides an index signal when the deformation 522a is aligned with the detector 504 and an encoder pulse as well to indicate detection of the deformation 512b being also aligned with the detector 504.

The shaft 506, for example, is a solid rod or other rigid component that extends at a first side out of the page to couple with an actuator (e.g., actuators 110), and extends at a second opposite side into the page to couple with a segment (e.g., hardware segments 106). Alternatively, in some examples, both the actuator and the segment are deployed at the same side of the shaft 506, or additional components (e.g., gears, etc.) are coupled between the shaft 508 and the segment.

The casing 508 is formed from any solid material configured to support the detector 504. In some embodiments, the casing 508 and any other component of the encoder 500 alternatively has any shape other than the shapes shown in FIG. 5A.

As shown, adjacent deformations of the deformations 512a-512p are separated by a same or similar distance. Thus, for example, detection of two adjacent deformations of the deformations 512a-512p by the detector 504 indicates that the encoder 500 rotated a given amount about its encoder axis (i.e., the shaft 506). Since the deformations 512a-512p are sixteen deformations in the illustration of FIG. 5A, the given amount is approximately 2π/16=π/8 radians.

Moreover, as shown, adjacent deformations of the deformations 522a-522e are each separated by a unique distance. In turn, for example, detection of two adjacent deformations of the deformations 522a-522e allows a robotic device that includes the encoder 500 to determine an exact encoder position of the encoder 500 about the encoder axis.

An example scenario for the operation of the encoder 500 in line with the discussion above is as follows. In the scenario, the encoder 500 (or the robotic device that includes the encoder 500) is unaware of a current encoder position of the encoder 500 about the encoder axis (i.e., the shaft 506). For instance, in the scenario, the encoder 500 is at an initial state (e.g., robotic device was turned on, or encoder 500 is uncalibrated, etc.) where the encoder 500 is at an unknown configuration about the encoder axis. In the scenario, the robotic device that includes the encoder 500 also includes a dataset (e.g., dataset 176) and/or a mapping (e.g., similar to the mapping of the block 208 of the method 200) that associates the deformations 522a-522e (e.g., a plurality of configurations of the encoder 500) with positions of an associated hardware segment (e.g., segments 106) in the robotic device. Table 5 illustrates an example dataset and/or mapping.

TABLE 5

| Configurations/ Deformations | Offset Angles (ticks) | Offset Angles (radians) | Mapping |
|---|---|---|---|
| 522a | 0 or 16 | 0 or 2π | P1 |
| 522b | 1 | π/8 | P2 |
| 522c | 3 | 3π/8 | P3 |
| 522d | 6 | 3π/4 | P4 |
| 522e | 10 | 5π/4 | P5 |

The first column of Table 5 is a list of a plurality of configurations of the encoder 500 that are detected when a respective deformation is aligned with the detector 504. For instance, the last row in Table 5 corresponds to the deformation 522e being aligned with the detector 504. The second column of Table 5 is a list of offset angles of each of the configurations associated with the deformations 522a-522e to a reference configuration of the encoder 500. In the second column, the offset angles are represented as a number of encoder ticks (e.g., sectors of the circular rotary device 502) in an anticlockwise direction to the reference configuration. As shown in Table 5, for instance, the reference configuration corresponds to an encoder position (e.g., deformation 512b) of the encoder 500 associated with the deformation 522a and is therefore either zero or sixteen encoder ticks (e.g., complete rotation of the rotary device 502) away from itself (i.e., a discontinuity). In turn, the deformations 522b, 522c, 522d, and 522e are, respectively, one encoder tick, three encoder ticks, six encoder ticks, and ten encoder ticks away from the deformation 522a in the anticlockwise direction. However, in some embodiments, the reference configuration can be any other configuration. The third column of Table 5 illustrates an additional or alternative representation of the offset angles represented in radian units to the reference configuration. The fourth column of Table 5 illustrates actual positions of the hardware segment (not shown in FIG. 5A) that is coupled to the encoder 500 when the encoder 500 is at the various configurations in the first column.

It is noted that the example dataset and/or mapping shown in Table 5 are for illustrative purposes only. In practice, various implementations are possible for the dataset and/or mapping. In one embodiment, the dataset includes either an indication of the second column (i.e., offset angles represented as encoder ticks, etc.) or an indication of the third column (i.e., offset angles represented in radian units) but not both, along with an indication of the associated configurations/deformations. In another embodiment, the mapping is a separate computer readable medium (e.g., file or files) that includes an indication of the fifth column of table 5 and an indication of the associated configurations/deformations. In yet another embodiment, the mapping is implemented as part of the dataset or as an algorithmic manipulation of data in the dataset. In one example of this embodiment, the positions P1-P5 are represented as encoder values/positions of the encoder 500 that correspond to the deformations 512a-512p, or as offset angles to the reference configuration. As another example in this embodiment, an end of a range of positions of the hardware segment is associated with a particular encoder value and/or offset angle, and other positions of the hardware segment are represented as a distance to the end of the range of positions of the hardware segment. Other embodiments are possible as well in line with the discussion above. Further, in some embodiments, the dataset and/or the mapping are implemented using any suitable data structure or format such as XML, YAML, binary data, encrypted data, relational database, text, array, tree, linked list, etc.

Continuing with the example scenario, the robotic device receives a request to adjust the position of the hardware segment to position P3 shown in Table 5. However, in the scenario, the current position of the hardware segment and the associated encoder position of the encoder 500 are unknown. In turn, the robotic device causes an actuator coupled to the hardware segment (and to the encoder 500) to actuate the hardware segment in a given direction. Suppose that, for the sake of example, the actuation in the given direction causes the encoder 500 (or the rotary device 502) to rotate in a clockwise direction. In turn, the encoder 500 (or the robotic device) keeps track of detected deformations of the deformations 512a-512p and/or the deformations 522a-522e. By way of example, the robotic device sets a counter that counts the number of detected deformations 512a-512p from the current configuration shown in FIG. 5A to zero. As the encoder 500 rotates in the clockwise direction about the encoder axis (e.g., the shaft 506), the detector 504 first detects the deformations 512b and 522a after rotating by one encoder tick (i.e., π/8 radians). In turn, the robotic device receives an encoder pulse from the encoder 500 indicating detection of the deformation 512b and updates the counter value to one. Further, the robotic device receives a first index signal from the encoder 500 indicating detection of the deformation 522a, and the robotic device thus associates the counter value (e.g., encoder value) of one with a position of the first index signal.

At this point in the scenario, the robotic device still does not know which deformation of the deformations 522a-522e caused the first index signal. Next, the encoder 500 continues rotation in the clockwise direction by another encoder tick (i.e., π/8 radians). Similarly, the encoder 500 provides another encoder pulse and a second index signal to indicate, respectively, the detector 504 detecting the deformation 512c and the deformation 522b. In turn, the robotic device associates the second index signal with the encoder value of two. At this point, the robotic device utilizes the dataset/mapping of Table 5 to determine the current position of the hardware segment and the current configuration of the encoder. For instance, only the deformations 522a and 522b in Table 5 are separated by an offset angle of: 2–1 (counter values)=1–0 (offset angle encoder ticks)=1 encoder tick. Thus, the current position is the position that corresponds to the deformation 522b in Table 5, which is position P2. In turn, the robotic device continues to adjust the position of the hardware segment in the given direction until two additional encoder pulses (i.e., 2π/8 radians) are received such that the encoder 500 is at the encoder position associated with the deformations 512e and 522c and the hardware segment is at the position P3. As a variation of the example scenario, if the requested position was instead position P1 and the robotic device determines the current position P2 after passing P1, the robotic device would alternatively cause the actuator to actuate the hardware segment in an opposite direction to the given direction back to the position P1.

In some scenarios, operations of the robotic device similar to the operation in the scenario above are more complex due to the reference configuration being associated with the deformation 522a. Continuing with the scenario above by way of example, the robotic device then receives a request to adjust the position of the hardware segment (currently at position P3) to a position P0 (not shown in Table 5) that corresponds to the encoder 500 encoder position associated with the deformation 512a (i.e., the encoder configuration illustrated in FIG. 5A). Typically, the robotic device would utilize the dataset/mapping of Table 5 to determine that the position P0 corresponds to the offset angle of 15, and determine that the actuator should actuate the hardware segment in the given direction to adjust the encoder 500 encoder position by (15–3) offset angle encoder ticks=12 encoder ticks clockwise rotation. However, such rotation is longer than adjusting the position of the hardware segment in the opposite direction for a change of the encoder position of the encoder 500 of four encoder ticks in the anticlockwise direction.

Moreover, in some embodiments, such clockwise rotation of the encoder 500 is not possible due to a particular arrangement of the robotic device. Continuing with the scenario above by way of example, consider that the robotic device of the encoder 500 is the robotic device 300 of FIGS. 3A-3D, and that the encoder 500 is coupled to the link 306 (e.g., the link 306 is the hardware segment). Referring back to FIG. 3D for this scenario, the minimum position 340 of the link 306 corresponds to the encoder position of the encoder 500 associated with the deformation 512a, and the maximum position 342 of the link 306 corresponds to the encoder position of the encoder 500 associated with the deformation 512m. In turn, the range of positions 344 shown in FIG. 3D correspond to the deformations 512a, 512b . . . 512l, 512m in that order. Thus, in this scenario, the encoder 500 (and the link 306) is prevented from rotating clockwise past the encoder position associated with deformation 512m due to the feature 332 shown in FIG. 3D.

In this instance, the range of positions 344 corresponds to the encoder 500 positions associated with the deformations 512a-512m due to assembling variability when the encoder 500 is coupled to the robotic device 300. However, in some instances, the issue of the example scenario does not exist. As an example, another robotic device similar to the robotic device 300 could be assembled to include the encoder 500 such that the range of positions 344 instead correspond to the deformations 512b-512n or any other range of encoder positions of the encoder 500 where the reference configuration (e.g., deformation 522a) does not correspond to an encoder position associated with the range of positions 344 of the segment 306. However, in some instances like this instance, the reference configuration corresponds to an encoder position is within the range of possible encoder positions of the encoder 500.

Another source of variability is also possible. In one example, the encoder 500 is a quasi-absolute encoder (e.g., encoder 144) that includes two disks (e.g., disks 146, 148), where a first disk includes the deformations 512a-p and a second disk includes the deformations 522a-522e. In this example, the rotary device 502 is provided by coupling the first disk with the second disk. Thus, in this example, positions of the deformations 522a-522e relative to positions of the deformations 512a-512p also vary due to coupling variability. In turn, the encoder position associated with the reference configuration also varies due to this coupling variability.

Accordingly, the present disclosure allows calibration of the encoder 500 to adjust the reference configuration in accordance with the method 200 for various applications of a robotic device that includes the encoder 500.

Figure 5B:
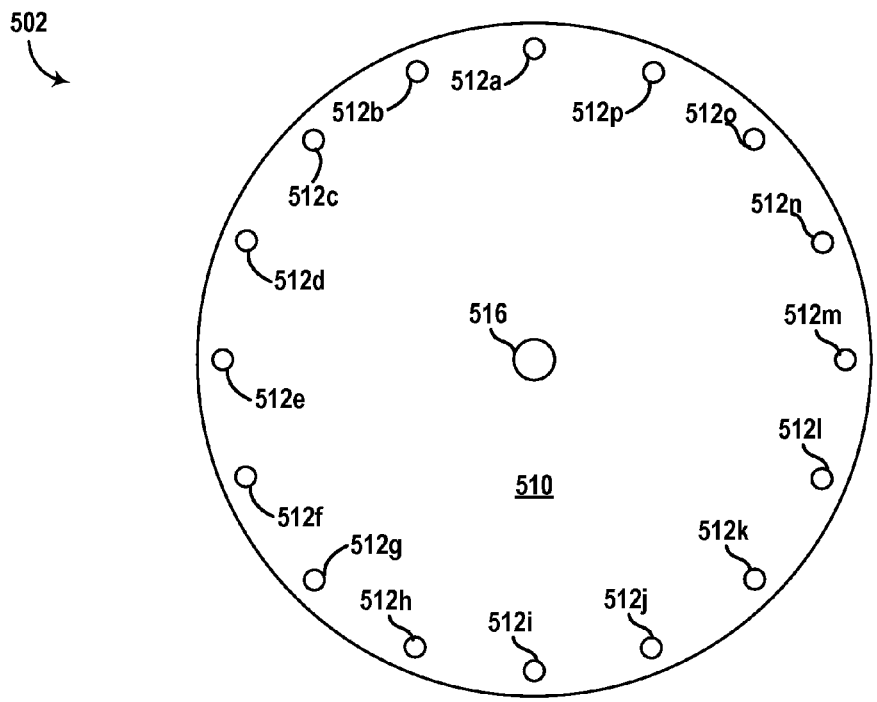
FIGS. 5B-5C illustrate example components of the rotary device of the encoder of FIG. 5A.
Figure 5C:
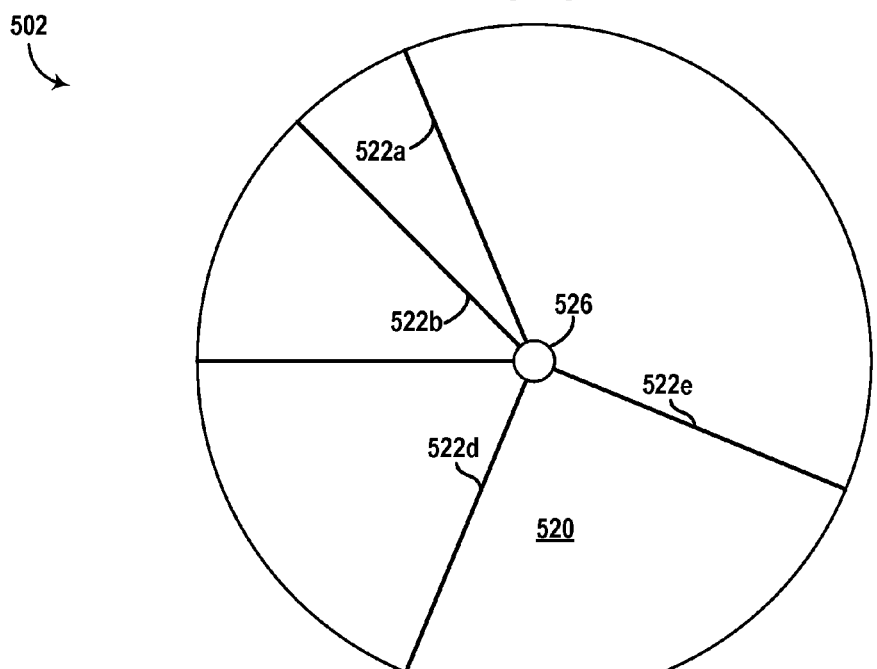

FIGS. 5B-5C illustrate example components of the rotary device 502 of the encoder 500 of FIG. 5A. As shown, the rotary device 502 includes a first disk 510 (FIG. 5B) and a second disk 520 (FIG. 5C) that are similar, respectively, to the first disk 146 and the second disk 148 of the quasi-absolute encoder 144 of the device 100.

Similarly to the first disk 146 and the second disk 148, the first disk 510 includes the first plurality of deformations 512a-512p (e.g., deformations 147) and the second disk 520 includes the second plurality of deformations 522a-522e (e.g., deformations 149). In some embodiments, the first disk 510 and the second disk 520 are coupled to one another during assembly/configuration of the encoder 500 by fitting the shaft 506 (FIG. 5A) into respective center-holes 516 (FIG. 5B) and 526 (FIG. 5C) to form the rotary device 502. In one example, the first disk 510 is a solid disk and the second disk 520 is a sticker that is applied to the first disk 510. Other examples are possible as well.

Similarly to the example scenarios above, consider a scenario where a manufacturer or provider of the second disk 520 provides a dataset (e.g., dataset 176) that indicates offset angles between a reference configuration of the second disk 520 and a plurality of configurations (e.g., deformations 522a-522e) of the second disk 520. Table 6 illustrates an example for such dataset.

TABLE 6

| Configurations/<br>Deformations | Offset Angles<br>(ticks) |
| --- | --- |
| 522a | 16 |
| 522b | 1 |
| 522c | 3 |
| 522d | 6 |
| 522e | 10 |

In line with the discussion above, in some examples, configurations of the encoder 500 vary according to relative positions of the deformations 512a-512p and the deformations 522a-522e when the first disk 510 is coupled to the second disk 520.

FIGS. 5D-5G illustrate example configurations of the encoder 500 of FIG. 5A. Continuing with the scenario above by way of example, the range of possible positions of the hardware segment correspond to a range of encoder positions of the encoder 500 in FIGS. 5D-5G associated with the deformations 512a, 512b . . . 512l, 512m. However, as shown, the relative positions of the deformations 522a-522e vary (e.g., due to coupling variability between the first disk 510 and the second disk 520) in each of the configurations in FIGS. 5D-5G.

Figure 5D:
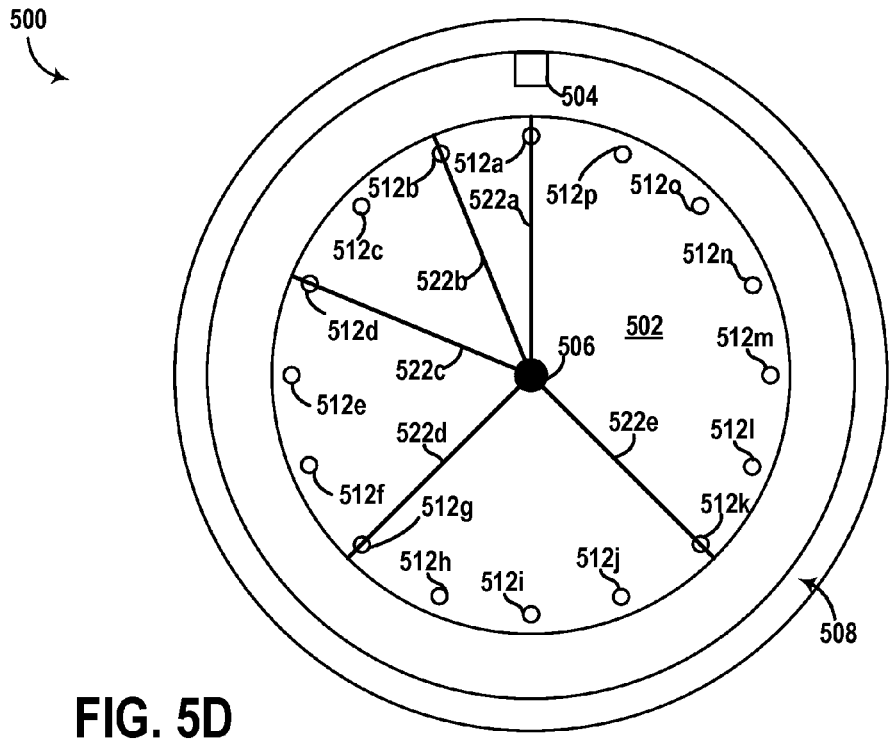
FIGS. 5D-5G illustrate example configurations of the encoder of FIG. 5A.
Figure 5E:
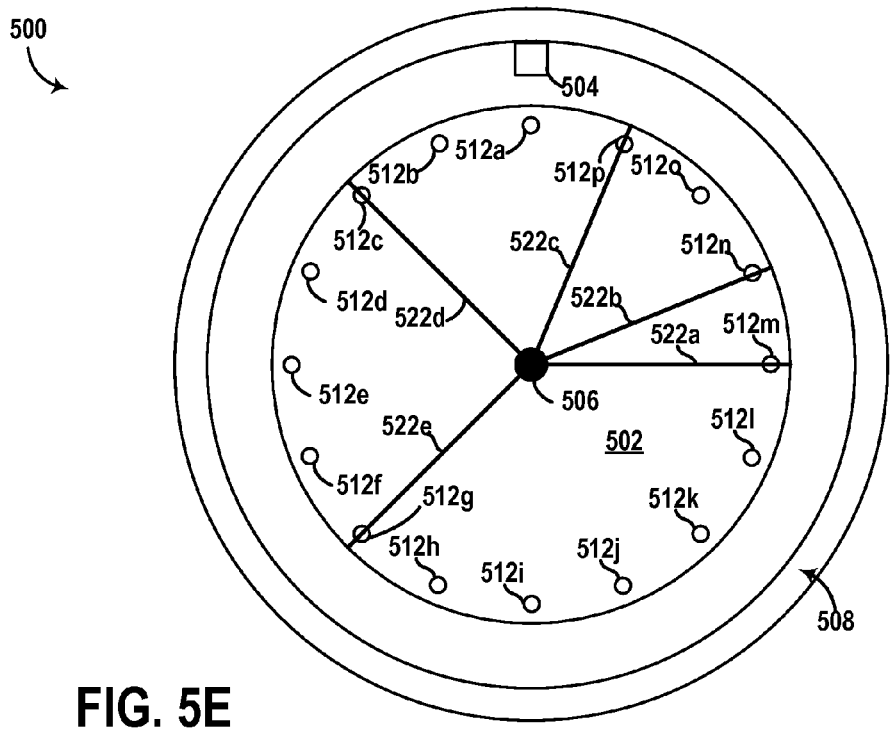

In FIG. 5D, the reference configuration (e.g., deformation 522a) corresponds to an encoder position at a first end (e.g., deformation 512a) of the range of possible encoder positions of the encoder 500. In FIG. 5E, the reference configuration corresponds to an encoder position at a second end (e.g., deformation 512m) of the range of possible encoder positions of the encoder 500. In both cases, the dataset of Table 6 assigns a continuous range of offset angles for the range of possible encoder positions (e.g., the discontinuity of the reference configuration is at an end of the range of possible encoder positions).

Figure 5F:
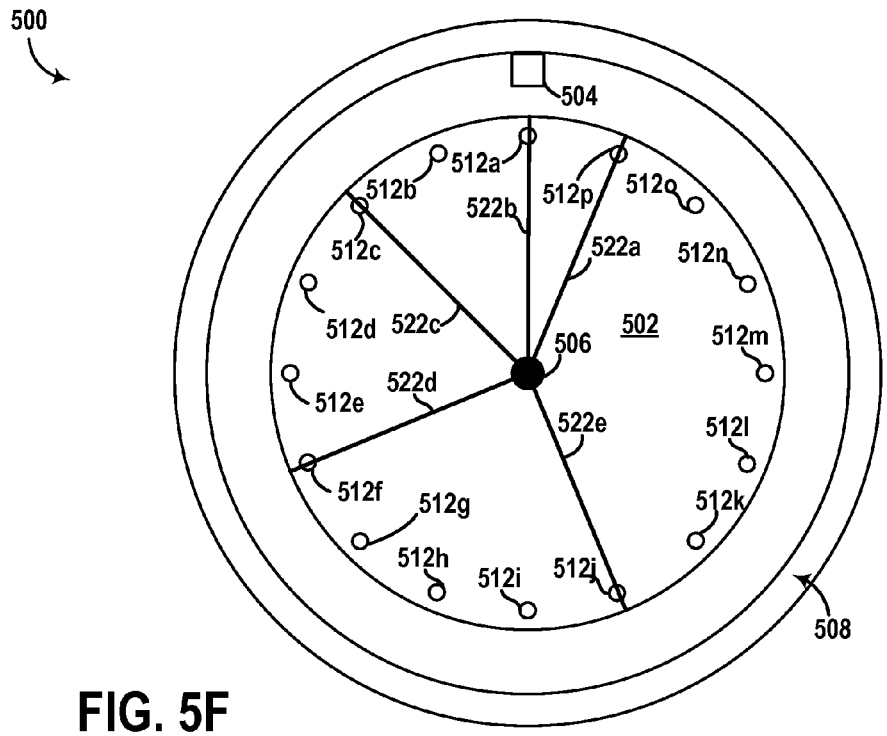

In FIG. 5F, the reference configuration (e.g., deformation 522a) corresponds to an encoder position outside the range of possible encoder positions of the encoder 500. As shown, for example, the reference configuration (deformation 522a) corresponds to the same position as the deformation 512p, which is outside the range of possible encoder positions (deformations 512a-512m) that correspond to the range of possible positions of the hardware segment. Alternatively, if the reference configuration instead corresponded to the same position as the deformation 512o or the deformation 512n, the reference configuration would also be outside the range of possible encoder positions. In either case, the dataset of Table 6 still assigns a continuous range of offset angles for the range of possible encoder positions (e.g., the discontinuity of the encoder position associated with the reference configuration is outside the range of possible encoder positions).

Figure 5G:
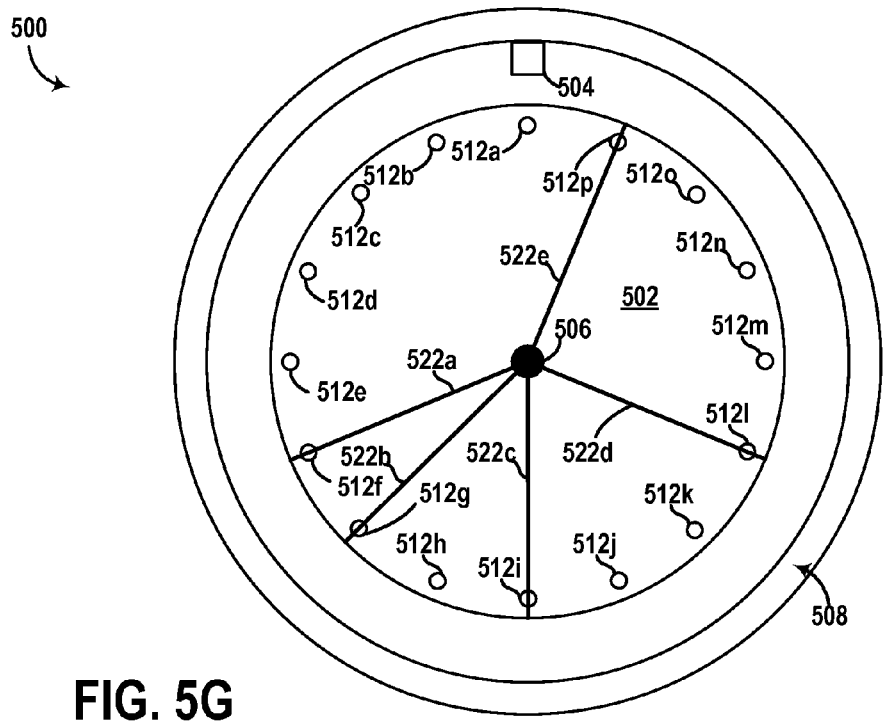

However, in FIG. 5G, the reference configuration (e.g., deformation 522a) corresponds to an encoder position within the range of possible encoder positions of the encoder 500 and also does not correspond to either end of the range of possible encoder positions. As shown, for example, the reference configuration is aligned with the deformation 512f, which is within such range (e.g., deformations 512b-512l). Alternatively, if the reference configuration (e.g., deformation 522a) instead corresponded to the encoder position associated with any of the deformations 512b-512l, the reference configuration would also correspond to an encoder position be within the range of possible encoder positions of the encoder 500 other than the end positions (512a, 512m). In both cases, the dataset of Table 6 does not assign a continuous range of offset angles for the range of possible encoder positions (e.g., the discontinuity of the encoder position associated with the reference configuration is within the range of possible encoder positions and also not at an end of the range of possible encoder positions).

In line with the discussion above, the present method allows calibrating an encoder such as that shown in FIG. 5G to adjust the reference configuration to an encoder position at: an end of the range of possible encoder positions, outside the range of possible encoder positions, or a given encoder position associated with a home position (e.g., mechanical zero, etc.) of the robotic device that is within the range of possible encoder positions.

Figure 5H:
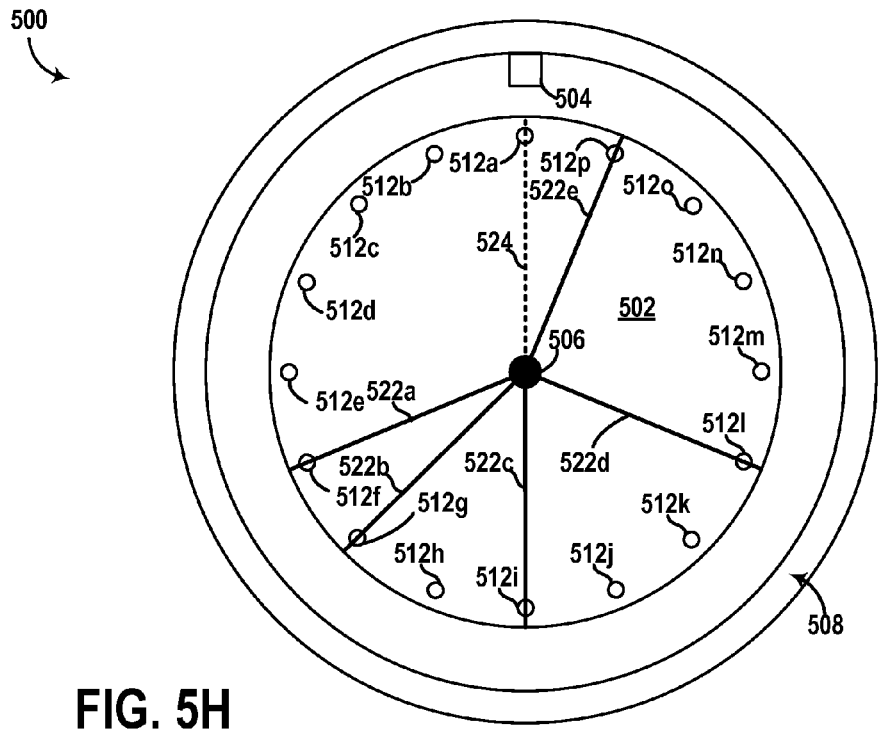
FIGS. 5H-5K illustrate example adjustments to the reference configuration of the encoder of FIG. 5G.

FIGS. 5H-5K illustrate example adjustments to the reference configuration of the encoder 500 shown in FIG. 5G. In FIG. 5H, an adjusted reference configuration 524 is assigned to a first end of the range of possible encoder positions of the encoder 500. Table 7 illustrates an example modification to the dataset of Table 7 in accordance with the adjusted reference configuration 524 of FIG. 5H.

TABLE 7

| Configurations/<br>Deformations | Original Offset<br>Angles | Modified Offset<br>Angles |
| --- | --- | --- |
| 522a | 16 | 5 |
| 522b | 1 | 6 |
| 522c | 3 | 8 |
| 522d | 6 | 11 |
| 522e | 10 | 15 |

In Table 7, the first two columns include data from the original dataset of Table 6. For instance, the second column includes the original offset angles from the deformation 522a (original reference configuration) to the deformations 522a-522e (the plurality of configurations of the encoder 500). The third column indicates the modified offset angles for the deformations 522a-522e using the adjusted reference configuration 524 shown in FIG. 5H. For instance, in Table 7, the modified offset angle of the configuration/deformation 522a is indicated as five offset angle ticks from the adjusted reference configuration 524 shown in FIG. 5H (in the anticlockwise direction). Similarly, the modified offset angles for the configurations/deformations 522b-522e also indicate encoder ticks to the adjusted reference configuration 524 shown in FIG. 5H. Through this process, the range of possible positions of the hardware segment coupled to the encoder 500 configuration of FIG. 5H is assigned to a continuous range of offset angles (e.g., minimum offset angle is 0 corresponding to deformation 512a, and maximum offset angle is 12 corresponding to deformation 512m) in the modified dataset of Table 7. In contrast, the unmodified dataset (second column of Table 7) has a discontinuity at the encoder position of the encoder 500 that corresponds to the deformations 512f and 522a.

In turn, a mapping between the modified offset angles of Table 7 and the range of possible positions of the hardware segment is determined. In one example, the mapping associates the encoder value/offset angle value of zero to the minimum position of the range of positions of the hardware segment and similarly associates other positions of the hardware segment with other offset angle values within the range of encoder positions indicated by the modified dataset of Table 7.

In some embodiments, calibration of the encoder 500 of FIG. 5H is performed similarly to the process in the scenario of FIG. 5A. As an example, consider the scenario where the encoder 500 is initially at an unknown encoder position of the range of possible encoder positions that correspond to the deformations 512a-512m. In this example, the robotic device that includes the encoder 500 actuates the hardware segment toward the minimum position. In turn, the robotic device identifies the encoder position 512a as the end of the possible range of encoder positions. Further, if during the adjustment the robotic device detects at least two index signals, the robotic device then identifies the positions of the encoder configurations associated with the deformations 522a-522e of the original dataset of Table 6, and modifies the dataset accordingly (e.g., Table 7). On the other hand, if two index signals were not detected, the robotic device then actuates the hardware segment away from the minimum position until at least two index signals are detected. Further, in some embodiments, where the range of possible positions of the hardware segment also include a maximum position other than the minimum position, the robotic device similarly actuates the hardware segment towards the maximum position to identify the range of possible encoder positions of the encoder 500 (e.g., identify that deformation 512m corresponds to the maximum position of the hardware segment).

Figure 5I:
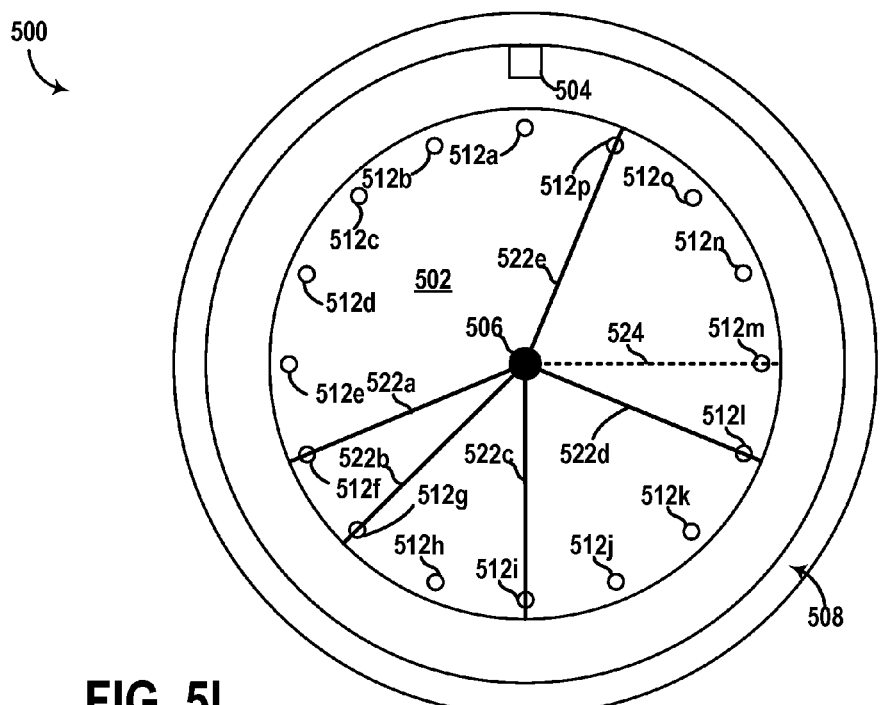

In FIG. 5I, the adjusted reference configuration 524 is instead selected to be at a second end of the range of possible encoder positions (e.g., deformation 512m). Table 8 illustrates example modifications to the dataset of Table 6 in this case.

TABLE 8

| Configurations/ Deformations | Original Offset Angles | First Modified Offset Angles | Second Modified Offset Angles |
|---|---|---|---|
| 522a | 16 | 9 | −7 |
| 522b | 1 | 10 | −6 |
| 522c | 3 | 12 | −4 |
| 522d | 6 | 15 | −1 |
| 522e | 10 | 3 | −13 |

The third column of Table 8 illustrates a first example modification similar to the modification described in Table 7. In this case, the range of possible encoder positions (512a-512m) is assigned to the continuous range of offset angle values (4 to 16). The fourth column of Table 8 illustrates an alternative second modification where the offset angles are represented as negative offset angles to the reference configuration. In this case, the range of possible encoder positions (512a-512m) is also assigned to an alternative continuous range of offset angle values (−12 to 0). The process for modifying the dataset and determining the mapping in either case is similar to the process described for FIG. 5H.

Figure 5J:
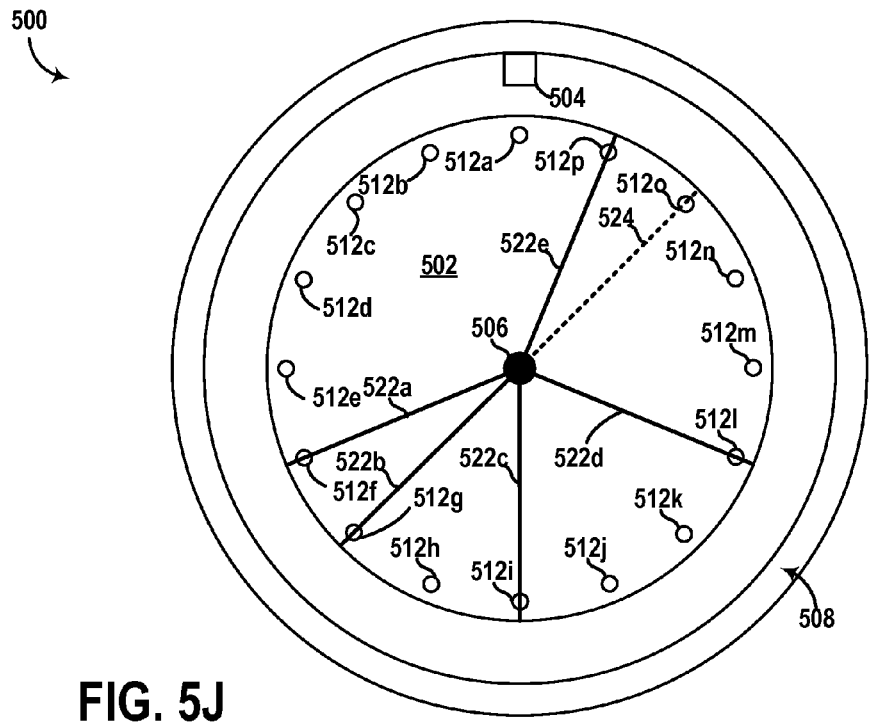

In FIG. 5J, the adjusted reference configuration 524 is instead assigned to an encoder position of the encoder 500 outside the range of possible encoder positions. As shown in FIG. 5J, for example, the adjusted reference configuration 524 corresponds to the deformation 512o. Table 9 illustrates an example modification to the dataset of Table 6 in this case.

TABLE 9

| Configurations/ Deformations | Original Offset Angles | Modified Offset Angles |
|---|---|---|
| 522a | 16 | 7 |
| 522b | 1 | 8 |
| 522c | 3 | 10 |
| 522d | 6 | 13 |
| 522e | 10 | 1 |

In Table 9, the range of possible encoder positions of the encoder 500 is also assigned to a continuous range of offset angle values (e.g., 2 to 14) in the modified dataset of Table 9. Alternatively, for example, if the adjusted reference configuration 524 in this case was instead at the deformation 512n or the deformation 512p, the modified dataset would be modified similarly to provide an alternative continuous range of offset angle values for the range of possible encoder positions of the encoder 500.

Figure 5K:
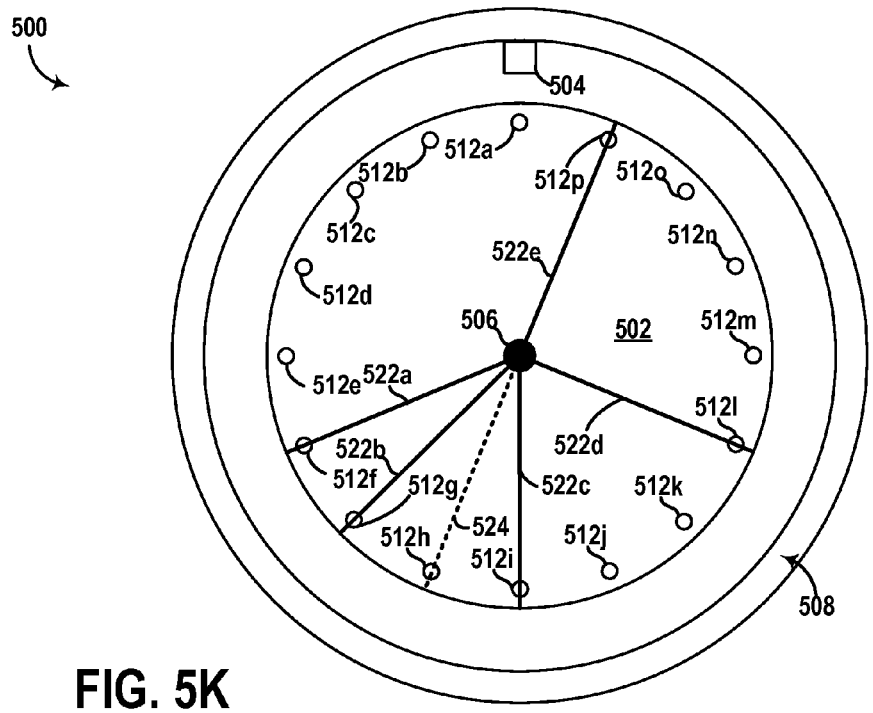

In FIG. 5K, the adjusted reference configuration 524 is instead assigned to a particular encoder position within the range of possible encoder positions of the encoder 500. In line with the discussion above, some embodiments herein include a robotic device that utilizes a home position (e.g., initial state, etc.) for the hardware segment, and receives requests to adjust the position of the hardware segment relative to the home position.

Referring back to the robotic device 300 of the FIG. 3D by way of example, consider a scenario where the encoder 500 is coupled to the link 306 (or an actuator thereof). Suppose that, for the sake of example in this scenario, the robotic device 300 is designed to receive requests to adjust the position of the link 306 relative to the home position illustrated in FIG. 3D. However, in the scenario, the encoder 500 is coupled to the link 306 at an arbitrary given orientation. Further, the dataset of Table 6 provided along with the encoder 500 is also affected by coupling variation between the first disk 510 and the second disk 520 (FIGS. 5B-5C). In turn, multiple robotic devices similar to the robotic device 300 that include encoders similar to the encoder 500 are calibrated in accordance with methods herein. Continuing with the example scenario, in this instance, the minimum position 340 corresponds to the deformation 512a, the maximum position 342 corresponds to the deformation 512m, and the home position corresponds to the deformation 512h. In turn, the range of positions 344 of the segment 306 corresponds to the range of encoder positions 512a-512m.

In this scenario, a mapping is determined such that first positions of the range of positions 344 between the home position shown in FIG. 3D and the maximum position 342 are represented by positive values, second positions between the home position and the minimum position 340 are represented by negative values, and the home position is represented by a value of zero. Suppose that, in the scenario, the encoder 500 of FIG. 5K is initially at an unknown encoder position within the range of possible encoder positions (e.g., deformations 512a-512m). In the scenario, the robotic device 300 adjusts the position of the link 306 to the home position shown in FIG. 3D, and detects an encoder value from the encoder 500 that corresponds to the home position (e.g., encoder value for deformation 512h). In one example, the robotic device adjusts the position incrementally until receiving an input (e.g., from a user or calibrator, etc.) that indicates that the link 306 is currently in the home position. Additionally, in the scenario, the robotic device 300 also adjusts the position of the link 306 to an end of the range of positions (e.g. the maximum position 342). In turn, the robotic device also detects another encoder value that corresponds to the link 306 being at the maximum position 342. Through this process, the robotic device 300 also receives at least two index signals associated with at least two of the configurations/deformations 522a-522d. In turn, the robotic device 300 associates the detected encoder values (e.g., for the home position and the maximum position 344) with offset angles indicated in the original dataset of Table 6. Further, the robotic device 300 modifies the original dataset of Table 6 in line with the discussion above. Table 10 illustrates an example modification to the dataset of Table 6 through this process.

TABLE 10

| Configurations/<br>Deformations | Original Offset<br>Angles | Modified Offset<br>Angles |
| --- | --- | --- |
| 522a | 16 | −2 |
| 522b | 1 | −1 |
| 522c | 3 | 1 |
| 522d | 6 | 4 |
| 522e | 10 | −8 |

In accordance with the modified offset angles in Table 10, the first positions of the link 306 from the home position to the maximum position 342 (FIG. 3D) are represented by the positive values 1 to 5. The second positions of the link 306 from the home position to the minimum position 340 are represented by the negative values −1 to −7. The home position itself is represented by the value of zero. Thus, in some examples, the modified dataset of Table 10 also serves as a mapping between the offset angles and the range of positions 344 of the link 306. Further, as shown in Table 10, the range of possible encoder positions of the encoder 500 is also assigned to a continuous range of offset angle values (e.g., −7 to 5).

In some embodiments, the robotic device 300 also adjusts the position of the link 306 to the minimum position 340 to identify an associated offset angle for the mapping. However, in this scenario, the modified dataset of Table 10 was determined without adjusting the position of the link 306 to the minimum position 340. Various processes and manipulations of the original dataset of Table 6 are possible to determine the modified dataset illustrated by the Table 10. Table 11 illustrates an example process for modifying the dataset in line with the discussion above.

TABLE 11

| Configurations/<br>Deformations | Original Offset<br>Angles | Offset Angles<br>Shifted | Home Position<br>Bias Applied |
| --- | --- | --- | --- |
| 522a | 16 | 0 | −2 |
| 522b | 1 | 1 | −1 |
| 522c | 3 | 3 | 1 |
| 522d | 6 | 6 | 4 |
| 522e | 10 | −6 | −8 |

As shown in Table 11, the original offset angles (i.e., to the original reference configuration/deformation 522a) of the home position and the maximum position 344 are first determined in line with the scenario above. Here, the home position has the original offset angle of 2, and the maximum position has the original offset angle of 7. In turn, as shown in the third column of Table 11, the original offset angles in the dataset that are greater than the maximum position offset angle of 7 are shifted by subtracting the maximum offset angle of 16. Further, as shown in the fourth column of Table 11, the home position bias (i.e., the original offset angle of 2) is applied to the shifted offset angles (e.g., subtracted) to determine the final modified offset angles. In some embodiments, where the modifications of Table 11 cause some of the offset angle values to be less than −16 (not shown in Table 11), such offset angle values can be adjusted by adding 16 such that the minimum offset angle in the modified dataset is greater than −16. The home position bias can be applied prior to, after, or in parallel with shifting the offset angles. Other processes are possible as well to determine the modified dataset illustrated in Table 11 in accordance with the present disclosure.

Figure 6:
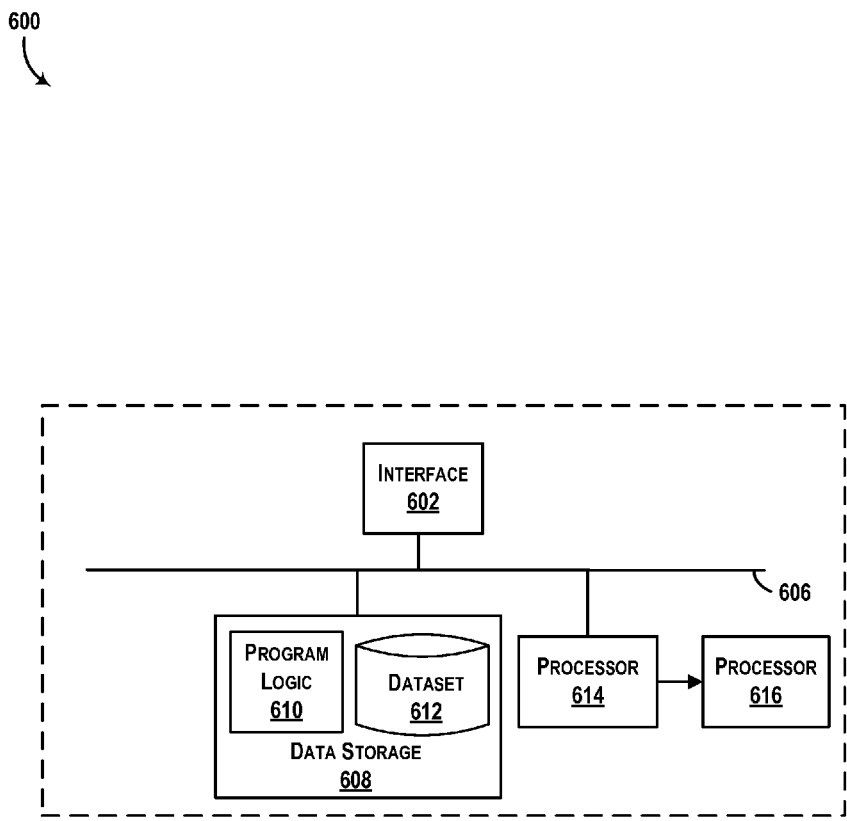
FIG. 6 is a block diagram of an example computing device, in accordance with at least some embodiments herein.

FIG. 6 is a block diagram of an example computing device 600, in accordance with at least some embodiments herein. In some embodiments, the computing device 600 is configured to operate at least some components of the devices 100, 300, 400, the encoder 500 in accordance with methods and process herein such as the method 200. In one embodiment, the computing device 600 corresponds to the computer system 122 of the device 100. In another embodiment, the computing device 600 is configured to assist operation of a robotic device, such as devices 100, 300, 400. For example, the computing device 600 may be an external computing device that provides instructions to operate the devices herein in accordance with the method 200. In yet another embodiment, the computing device 600 is an external computing device in communication with a robotic device such as devices 100, 300, 400. For example, the device 600 may receive calibration data from a robotic device that includes one or more encoder positions for particular positions of an associated hardware segment, and thereby determine a mapping between positions of the hardware segment and encoder positions of the encoder. Other examples are possible as well.

In some examples, some components illustrated in FIG. 6 are distributed across multiple computing devices (e.g., desktop computers, servers, hand-held devices, etc.). In other examples, as shown, the components are part of one example device 600.

The device 600 includes an interface 602, data storage 608, and a processor 614. Components illustrated in FIG. 6 are linked together by a communication link 606. In some examples, the device 600 includes hardware to enable communication within the device 600 and between the device 600 and another computing device (not shown), such as the devices 100, 300, and/or 400. Example hardware includes transmitters, receivers, antennas, and/or wiring.

The interface 602 is configured to allow the device 600 to communicate with another computing device (not shown), such as a robotic device, or with a user of the device 600, for example. Thus, the interface 602 is configured to receive input data from one or more devices (or users), and is also configured to send output data to the one or more devices. In some examples, the interface 602 also maintains and manages records of data received and sent by the device 600. In other examples, records of data are maintained and managed by other components of the device 600. In some examples, the interface 602 also includes a receiver and transmitter to receive and send data. In some examples, the interface 602 also includes a user-interface, such as a keyboard, microphone, touch screen, etc., to receive inputs as well. Further, in some examples, the interface 602 also includes an interface with output devices such as a display, speaker, etc. Further, in some examples, the interface 602 includes wired communication components (e.g., USB ports, parallel ports, Ethernet interface, etc.) or wireless communication components (e.g., WiFi interface, Bluetooth interface, etc.). In one example, the interface 602 allows the device 600 to communicate with another device, such as the device 100 of FIG. 1.

The processor 614 is configured to operate the device 600. In one example, the processor 614 is configured to cause the device 600 to provide a request to a robotic device for calibration data. Further, in some examples, the processor 614 is also configured to operate other components of the device 600 such as input/output components or communication components. The device 600 is illustrated to include an additional processor 616. In some examples, the processor 616 configured to control some of the aspects described for the processor 614. In one example, the processor 614 is a controller that operates the interface 602, and the processor 616 is configured to control other aspects such as the data storage 608. Some embodiments may include only one processor (e.g., processor 614) or may include additional processors configured to control various aspects of the device 600.

The data storage 608 stores program logic 610 that can be accessed and executed by the processor 614 and/or the processor 616. In one example, the program logic 610 includes instructions for any of the functions described herein for the devices 100, 300, 400, or any component thereof. In another example, the program logic 610 includes any of the functions described herein for the method 200 and/or other process herein.

The communication link 606 is illustrated as a wired connection; however, wireless connections may also be used. In one example, the communication link 606 is a wired serial bus such as a universal serial bus or a parallel bus, or a wireless connection using, e.g., short-range wireless radio technology, communication protocols described in IEEE 802.11 (including any IEEE 802.11 revisions), or cellular wireless technology, among other possibilities.

Figure 7:
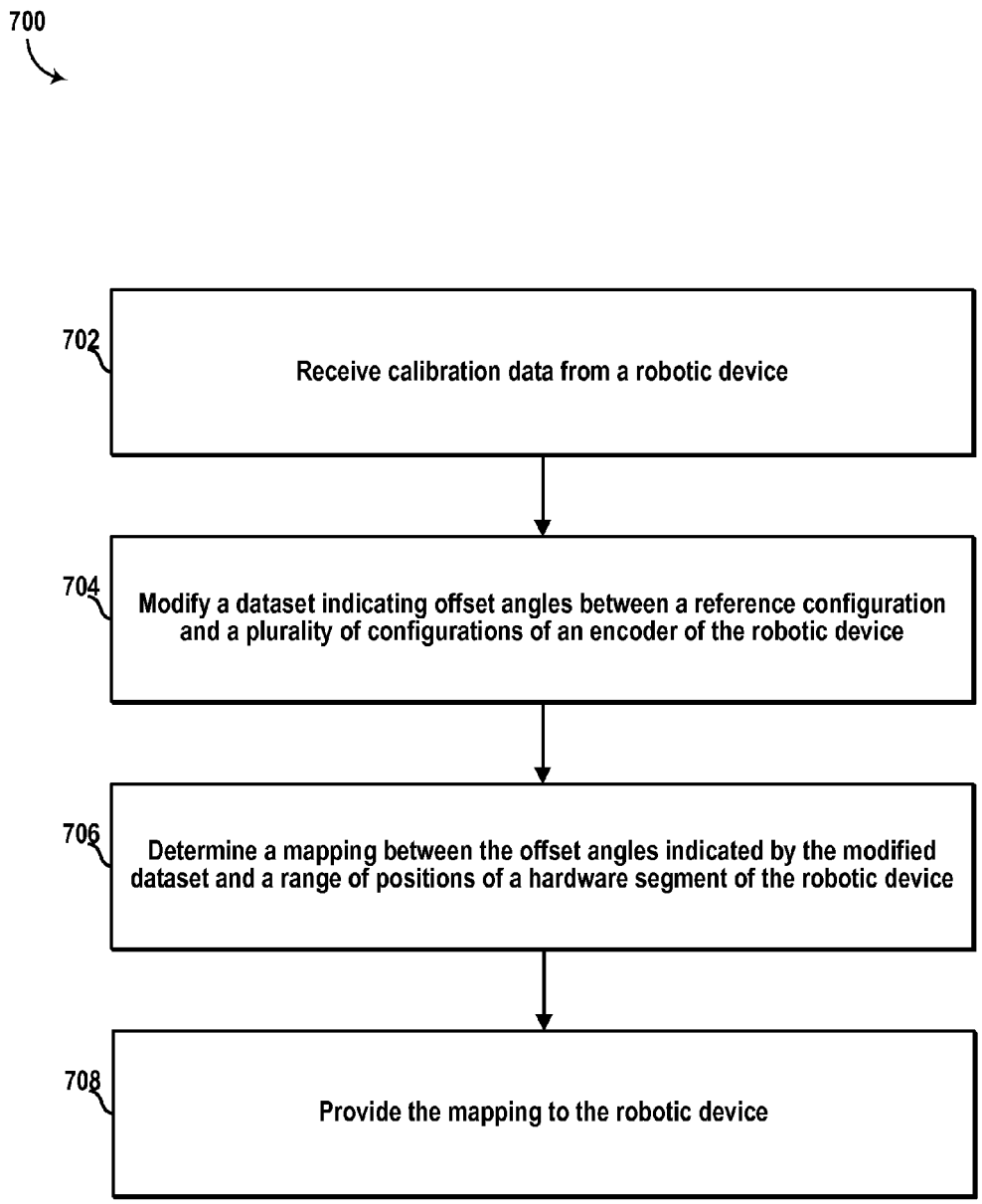
FIG. 7 is a block diagram of another example method, in accordance with at least some embodiments herein.

FIG. 7 is a block diagram of another method 700, according to an example embodiment. Method 700 shown in FIG. 7 presents an embodiment of a method that could be used with the devices 100, 300, 400, 600, and the encoder 500, for example. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In some examples, the method 700 provides a mechanism for an external computing device to perform the modification of the dataset and/or the mapping described in the method 200. Thus, functions of the method 700, in these examples, are performed by an external computing device similar to the computing device 600 of FIG. 6 that is in communication with a robotic device similar to the device 100 of FIG. 1.

At block 702, the method 700 includes receiving calibration data from a robotic device. The robotic device, in some examples, is similar to the device 100. Accordingly, the robotic device includes a hardware segment (e.g., hardware segments 106) and an encoder (e.g., encoders 114), and the calibration data indicates a given encoder position of the encoder associated with the hardware segment being at an end of a range of positions of the hardware segment.

At block 704, the method 700 includes modifying a dataset indicating offset angles between a reference configuration and a plurality of configurations of the encoder such that the reference configuration corresponds to the given encoder position indicated by the calibration data. In one example, the dataset is accessible to the computing device of the present method (e.g., stored in a memory, stored in data storage 608, etc.). In another example, the dataset is stored in a memory of the robotic device (e.g., dataset 176, etc.) and the computing device modifies the dataset by sending instructions to the robotic device. In yet another example, the dataset is included in the calibration data provided by the robotic device. Other examples are possible as well. Through this process, the reference configuration is adjusted to be indicative of the encoder being at the given encoder position associated with an end of the range of possible encoder positions of the encoder similarly to block 206 of the method 200. Alternatively, in some examples, the reference configuration is adjusted to correspond to an encoder position outside the range of possible encoder positions, or at a particular encoder position (e.g., home position, etc.) within the range of encoder positions.

At block 706, the method 700 includes determining a mapping between offset angles indicated by the modified dataset and a range of positions of a hardware segment of the robotic device, similarly to the determination of the mapping at block 208 of the method 200.

In some examples, the calibration data also indicates a particular encoder position of the encoder that corresponds to the hardware segment being at a home position within the range of positions, similarly to the position of the link 306 of the robotic device 300 in FIG. 3D. In these examples, the method 700 also includes modifying the mapping such that the offset angles are represented by positive values for first positions of the hardware segment in a first direction relative to the home position, negative values for second positions of the hardware segment in a second direction relative to the home position, and a value of zero for the home position of the hardware segment. For example, the mapping in this case is similar to the mapping in Table 10.

At block 708, the method 700 includes providing the mapping to the robotic device. In turn, in some examples, the robotic device utilizes the mapping to adjust positions of the hardware segment in line with the discussion above.

Figure 8:
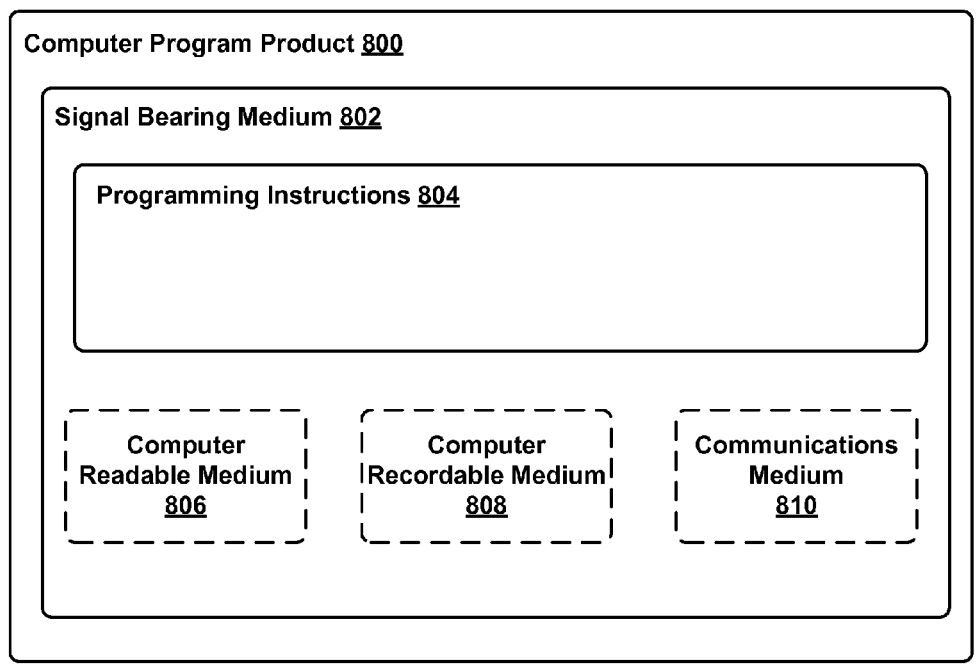
FIG. 8 depicts an example computer readable medium configured in accordance with at least some embodiments herein.

FIG. 8 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions methods 200, 600, etc.) may be implemented by computer program instructions encoded on a computer readable storage media in a machine-readable format, or on other media or articles of manufacture (e.g., instructions 174 of the device 100, program logic 610 of the device 600, etc.). FIG. 8 is a schematic illustrating a conceptual partial view of an example computer program product that includes a computer program for executing a computer process on a computing device, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
a hardware segment;
an actuator to adjust a position of the hardware segment within a range of positions;
an encoder to rotate about an encoder axis responsive to the actuator adjusting the position of the hardware segment, wherein the encoder includes a plurality of deformations separated by given offset angles;
data storage that includes a dataset indicating offset angles between a reference configuration and a plurality of configurations of the encoder, wherein the offset angles indicated in the dataset relate to the given offset angles between the plurality of deformations, and wherein the reference configuration is indicative of the encoder being at a given encoder position about the encoder axis; and
a controller to cause the actuator to adjust the position of the hardware segment to an end of the range of positions, and to:
responsively identify a range of encoder positions that corresponds to the range of positions of the hardware segment;
modify the dataset such that the reference configuration is indicative of the encoder being at an end of the range of encoder positions; and
determine a mapping between the offset angles indicated by the modified dataset and the range of positions of the hardware segment.

2. The device of claim 1, wherein the encoder is coupled, at a given orientation of the encoder, to the hardware segment, and wherein the range of encoder positions are associated with the range of positions of the hardware segment based on the given orientation of the encoder.

3. The device of claim 1, wherein the controller:
detects at least two index signals and corresponding encoder positions from the encoder responsive to the adjustment of the position of the hardware segment, wherein a given index signal is indicative of the encoder having a given configuration of the plurality of configurations indicated in the dataset;
identifies at least one offset angle indicated by the dataset that is associated with one or more of the at least two index signals; and
associates the range of encoder positions with the plurality of configurations of the encoder based on the identified at least one offset angle and the detected corresponding encoder positions, wherein the controller determines the mapping based on the association.

4. The device of claim 1, wherein the controller causes the actuator to adjust the position of the hardware segment to a given position within the range of positions based on the mapping.

5. The device of claim 1, wherein the controller:
receives an input indicative of the hardware segment being at a home position within the range of positions;
responsively identifies a given encoder position that corresponds to the hardware segment being at the home position; and
modifies the mapping such that the offset angles are represented by positive values for first positions of the hardware segment in a first direction relative to the home position, negative values for second positions of the hardware segment in a second direction relative to the home position, and a value of zero for the home position of the hardware segment.

6. The device of claim 5, wherein the controller:

receives a request to adjust the position of the hardware segment to a particular position relative to the home position; and causes the actuator to adjust the position of the hardware segment to the particular position based on the modified mapping.

7. The device of claim 1, wherein the encoder comprises:

a first disk that includes another plurality of deformations, wherein the encoder provides a given encoder value based on detection of a corresponding deformation of the other plurality of deformations; and a second disk coupled to the first disk, wherein the second disk includes the plurality of deformations separated by the given offset angles, and wherein the encoder provides an index signal in response to detection of a deformation of the plurality of deformations.

8. The device of claim 1, further comprising:

a camera to provide an image of the hardware segment, wherein the data storage includes a stored image of the hardware segment associated with the hardware segment being at the end of the range of positions, and wherein the controller detects that the hardware segment is at the end of the range of positions based on a comparison between the image and the stored image.

9. The device of claim 1, further comprising:

a mechanical feature positioned at the end of the range of positions of the hardware segment, wherein the controller detects that the hardware segment is at the end of the range of positions based on detection of the mechanical feature.

10. The device of claim 1, further comprising:

an inclinometer to provide data indicative of the position of the hardware segment, wherein the controller causes the actuator to adjust the position of the hardware segment based on the data from the inclinometer.

11. The device of claim 1, wherein the controller:

causes the actuator to adjust the position of the hardware segment to another end of the range of positions; and identifies the range of encoder positions responsive also to the adjustment of the position of the hardware segment to the other end of the range of positions.

12. A method comprising:

adjusting, by a robotic device that includes one or more processors, a position of a hardware segment of the robotic device to an end of a range of positions of the hardware segment;

responsively identifying a range of encoder positions about an encoder axis of an encoder of the robotic device that corresponds to the range of positions of the hardware segment, wherein the encoder rotates about the encoder axis responsive to adjustment of the position of the hardware segment, and wherein the encoder includes a plurality of deformations separated by given offset angles;

modifying a dataset indicating offset angles between a reference configuration and a plurality of configurations of the encoder such that the reference configuration corresponds to an encoder position outside the range of encoder positions, wherein the offset angles indicated in the dataset relate to the given offset angles between the plurality of deformations; and determining a mapping between the offset angles indicated by the modified dataset and the range of positions of the hardware segment.

13. The method of claim 12, further comprising:

detecting at least two index signals and corresponding encoder positions from the encoder responsive to the adjustment of the position, wherein a given index signal is indicative of the encoder having a given configuration of the plurality of configurations indicated in the dataset;

identifying at least one offset angle indicated in the dataset that is associated with one or more of the at least two index signals; and associating the range of encoder positions with the plurality of configurations of the encoder based on the identified at least one offset angle and the detected corresponding encoder positions, wherein determining the mapping is based on the association.

14. The method of claim 12, further comprising:

receiving an input indicative of the hardware segment being at a home position within the range of positions;

responsively identifying a given encoder position that corresponds to the hardware segment being at the home position; and modifying the mapping such that the offset angles are represented by positive values for first positions of the hardware segment in a first direction relative to the home position, negative values for second positions of the hardware segment in a second direction relative to the home position, and a value of zero for the home position of the hardware segment.

15. The method of claim 14, further comprising:

receiving a request to adjust the position of the hardware segment to a particular position relative to the home position; and adjusting the position of the hardware segment to the particular position based on the modified mapping.

16. The method of claim 12, further comprising:

detecting a mechanical feature positioned at the end of the range of positions of the hardware segment; and detecting that the hardware segment is at the end of the range of positions based on the detection of the mechanical feature.

17. The method of claim 12, further comprising:

receiving, from a camera in the robotic device, an image of the hardware segment;

obtaining, from a memory accessible to the robotic device, a stored image of the hardware segment associated with the hardware segment being at the end of the range of positions; and based on a comparison between the image and the stored image, detecting that the hardware segment is at the end of the range of positions.

18. The method of claim 12, further comprising:

adjusting the position of the hardware segment to another end of the range of positions; and identifying the range of encoder positions responsive also to the adjustment of the position of the hardware segment to the other end of the range of positions.

19. A method comprising:

receiving, by a computing device that includes one or more processors, calibration data from a robotic device indicative of a given encoder position of an encoder that rotates about an encoder axis responsive to adjustment of a position of a hardware segment within a range of positions, wherein the given encoder position is associated with the hardware segment being at an end of the range of positions, and wherein the encoder includes a plurality of deformations separated by given offset angles;

modifying a dataset indicating offset angles between a reference configuration and a plurality of configurations of the encoder such that the reference configuration is indicative of the encoder being at the given encoder position, wherein the offset angles indicated in the dataset relate to the given offset angles between the plurality of deformations;

determining a mapping between the offset angles indicated by the modified dataset and the range of positions of the hardware segment; and providing the mapping to the robotic device.

20. The method of claim 19, wherein the calibration data is also indicative of a particular encoder position that corresponds to the hardware segment being at a home position within the range of positions, the method further comprising:

modifying the mapping such that the offset angles are represented by positive values for first positions of the hardware segment in a first direction relative to the home position, negative values for second positions of the hardware segment in a second direction relative to the home position, and a value of zero for the home position of the hardware segment.

* * * * *